United States Patent
Evans

(10) Patent No.: US 9,219,403 B2
(45) Date of Patent: Dec. 22, 2015

(54) MAGNETIC SHEAR FORCE TRANSFER DEVICE

(75) Inventor: Robert S. Evans, Austin, TX (US)

(73) Assignee: Correlated Magnetics Research, LLC, Huntsville, AL (US)

( * ) Notice: Subject to any disclaimer, the term of this patent is extended or adjusted under 35 U.S.C. 154(b) by 582 days.

(21) Appl. No.: 13/604,939

(22) Filed: Sep. 6, 2012

(65) Prior Publication Data

US 2014/0062241 A1  Mar. 6, 2014

Related U.S. Application Data

(60) Provisional application No. 61/573,462, filed on Sep. 6, 2011.

(51) Int. Cl.
*H02K 49/00* (2006.01)
*H02K 49/10* (2006.01)

(52) U.S. Cl.
CPC ............ *H02K 49/104* (2013.01); *H02K 49/108* (2013.01); *H02K 2213/03* (2013.01)

(58) Field of Classification Search
CPC ....... H02K 7/10; H02K 49/104; H02K 49/00; H02K 49/108; H02K 2213/03
USPC ......................................................... 310/103
See application file for complete search history.

(56) References Cited

U.S. PATENT DOCUMENTS

| | | |
|---|---|---|
| 93,931 A | 8/1869 | Westcott |
| 361,248 A | 4/1887 | Winton |
| 381,968 A | 5/1888 | Tesla |
| 493,858 A | 3/1893 | Edison |
| 675,323 A | 5/1901 | Clark |
| 687,292 A | 11/1901 | Armstrong |
| 996,933 A | 7/1911 | Lindquist |
| 1,081,462 A | 12/1913 | Patton |

(Continued)

FOREIGN PATENT DOCUMENTS

| | | |
|---|---|---|
| CN | 1615573 A | 5/2005 |
| DE | 2938782 A1 | 4/1981 |

(Continued)

OTHER PUBLICATIONS

International Search Report and Written Opinion of the International Searching Authority issued in Application No. PCT/US12/61938 dated Feb. 26, 2013.

(Continued)

*Primary Examiner* — Joshua Benitez-Rosario
*Assistant Examiner* — Leda Pham
(74) *Attorney, Agent, or Firm* — Vector IP Law Group; Robert S. Babayi

(57) ABSTRACT

A magnetic shear force transfer device for transferring shear forces across a non-magnetic gap includes a first magnetic structure comprising concentric circular tracks of magnetic sources magnetically printed into a first magnetizable material a second magnetic structure comprising concentric circular tracks of magnetic sources magnetically printed into a second magnetizable material. Each concentric circular track has an even number of magnetic sources where adjoining magnetic sources alternate in polarity. One or more tracks of the first magnetic structure are rotated relative to one or more tracks of the second magnetic structure such that a maximum torque condition coincides to one angular orientation between the first and second magnetic structures.

20 Claims, 26 Drawing Sheets

A

B

(56) References Cited

U.S. PATENT DOCUMENTS

| | | |
|---|---|---|
| 1,171,351 A | 2/1916 | Neuland |
| 1,236,234 A | 8/1917 | Troje |
| 1,252,289 A | 1/1918 | Murray, Jr. |
| 1,301,135 A | 4/1919 | Karasick |
| 1,312,546 A | 8/1919 | Karasick |
| 1,323,546 A | 8/1919 | Karasick |
| 1,554,236 A | 1/1920 | Simmons |
| 1,343,751 A | 6/1920 | Simmons |
| 1,624,741 A | 12/1926 | Leppke et al. |
| 1,784,256 A | 12/1930 | Stout |
| 1,895,129 A | 1/1933 | Jones |
| 2,048,161 A | 7/1936 | Klaiber |
| 2,147,482 A | 12/1936 | Butler |
| 2,186,074 A | 1/1940 | Koller |
| 2,240,035 A | 4/1941 | Catherall |
| 2,243,555 A | 5/1941 | Faus |
| 2,269,149 A | 1/1942 | Edgar |
| 2,327,748 A | 8/1943 | Smith |
| 2,337,248 A | 12/1943 | Koller |
| 2,337,249 A | 12/1943 | Koller |
| 2,389,298 A | 11/1945 | Ellis |
| 2,401,887 A | 6/1946 | Sheppard |
| 2,414,653 A | 1/1947 | lokholder |
| 2,438,231 A | 3/1948 | Schultz |
| 2,471,634 A | 5/1949 | Vennice |
| 2,475,456 A | 7/1949 | Norlander |
| 2,508,305 A | 5/1950 | Teetor |
| 2,513,226 A | 6/1950 | Wylie |
| 2,514,927 A | 7/1950 | Bernhard |
| 2,520,828 A | 8/1950 | Bertschi |
| 2,565,624 A | 8/1951 | phelon |
| 2,570,625 A | 10/1951 | Zimmerman et al. |
| 2,690,349 A | 9/1954 | Teetor |
| 2,694,164 A | 11/1954 | Geppelt |
| 2,964,613 A | 11/1954 | Williams |
| 2,701,158 A | 2/1955 | Schmitt |
| 2,722,617 A | 11/1955 | Cluwen et al. |
| 2,770,759 A | 11/1956 | Ahlgren |
| 2,837,366 A | 6/1958 | Loeb |
| 2,853,331 A | 9/1958 | Teetor |
| 2,888,291 A | 5/1959 | Scott et al. |
| 2,896,991 A | 7/1959 | Martin, Jr. |
| 2,935,352 A | 5/1960 | Heppner |
| 2,935,353 A | 5/1960 | Loeb |
| 2,936,437 A | 5/1960 | Fraser et al. |
| 2,962,318 A | 11/1960 | Teetor |
| 3,055,999 A | 9/1962 | Lucas |
| 3,089,986 A | 5/1963 | Gauthier |
| 3,102,314 A | 9/1963 | Alderfer |
| 3,151,902 A | 10/1964 | Ahlgren |
| 3,204,995 A | 9/1965 | Teetor |
| 3,208,296 A | 9/1965 | Baermann |
| 3,238,399 A | 3/1966 | Johanees et al. |
| 3,273,104 A | 9/1966 | Krol |
| 3,288,511 A | 11/1966 | Tavano |
| 3,301,091 A | 1/1967 | Reese |
| 3,351,368 A | 11/1967 | Sweet |
| 3,382,386 A | 5/1968 | Schlaeppi |
| 3,408,104 A | 10/1968 | Raynes |
| 3,414,309 A | 12/1968 | Tresemer |
| 3,425,729 A | 2/1969 | Bisbing |
| 2,932,545 A | 4/1969 | Foley |
| 3,468,576 A | 9/1969 | Beyer et al. |
| 3,474,366 A | 10/1969 | Barney |
| 3,500,090 A | 3/1970 | Baermann |
| 3,521,216 A | 7/1970 | Tolegian |
| 3,645,650 A | 2/1972 | Laing |
| 3,668,670 A | 6/1972 | Andersen |
| 3,684,992 A | 8/1972 | Huguet et al. |
| 3,690,393 A | 9/1972 | Guy |
| 3,696,258 A | 10/1972 | Anderson et al. |
| 3,790,197 A | 2/1974 | Parker |
| 3,791,309 A | 2/1974 | Baermann |
| 3,802,034 A | 4/1974 | Bookless |
| 3,803,433 A | 4/1974 | Ingenito |
| 3,808,577 A | 4/1974 | Mathauser |
| 3,836,801 A | 9/1974 | Yamashita et al. |
| 3,845,430 A | 10/1974 | Petkewicz et al. |
| 3,893,059 A | 7/1975 | Nowak |
| 3,976,316 A | 8/1976 | Laby |
| 4,079,558 A | 3/1978 | Gorham |
| 4,117,431 A | 9/1978 | Eicher |
| 4,129,846 A | 12/1978 | Yablochnikov |
| 4,209,905 A | 7/1980 | Gillings |
| 4,222,489 A | 9/1980 | Hutter |
| 4,296,394 A | 10/1981 | Ragheb |
| 4,340,833 A | 7/1982 | Sudo et al. |
| 4,352,960 A | 10/1982 | Dormer et al. |
| 4,355,236 A | 10/1982 | Holsinger |
| 4,399,595 A | 8/1983 | Yoon et al. |
| 4,416,127 A | 11/1983 | Gomez-Olea Naveda |
| 4,451,811 A | 5/1984 | Hoffman |
| 4,453,294 A | 6/1984 | Morita |
| 4,517,483 A | 5/1985 | Hucker et al. |
| 4,535,278 A | 8/1985 | Asakawa |
| 4,547,756 A | 10/1985 | Miller et al. |
| 4,629,131 A | 12/1986 | Podell |
| 4,645,283 A | 2/1987 | MacDonald et al. |
| 4,680,494 A | 7/1987 | Grosjean |
| 4,764,743 A | 8/1988 | Leupold et al. |
| 4,808,955 A | 2/1989 | Godkin et al. |
| 4,837,539 A | 6/1989 | Baker |
| 4,849,749 A | 7/1989 | Fukamachi et al. |
| 4,862,128 A | 8/1989 | Leupold |
| H693 H | 10/1989 | Leupold |
| 4,893,103 A | 1/1990 | Leupold |
| 4,912,727 A | 3/1990 | Schubert |
| 4,941,236 A | 7/1990 | Sherman et al. |
| 4,956,625 A | 9/1990 | Cardone et al. |
| 4,980,593 A | 12/1990 | Edmundson |
| 4,993,950 A | 2/1991 | Mensor, Jr. |
| 4,994,778 A | 2/1991 | Leupold |
| 4,996,457 A | 2/1991 | Hawsey et al. |
| 5,013,949 A | 5/1991 | Mabe, Jr. |
| 5,020,625 A | 6/1991 | Yamauchi et al. |
| 5,050,276 A | 9/1991 | Pemberton |
| 5,062,855 A | 11/1991 | Rincoe |
| 5,123,843 A | 6/1992 | Van der Zel et al. |
| 5,179,307 A | 1/1993 | Porter |
| 5,190,325 A | 3/1993 | Doss-Desouza |
| 5,213,307 A | 5/1993 | Perrillat-Amede |
| 5,302,929 A | 4/1994 | Kovacs |
| 5,309,680 A | 5/1994 | Kiel |
| 5,345,207 A | 9/1994 | Gebele |
| 5,349,258 A | 9/1994 | Leupold et al. |
| 5,367,891 A | 11/1994 | Furuyama |
| 5,383,049 A | 1/1995 | Carr |
| 5,394,132 A | 2/1995 | Poil |
| 5,399,933 A | 3/1995 | Tsai |
| 5,425,763 A | 6/1995 | Stemmann |
| 5,440,997 A | 8/1995 | Crowley |
| 5,461,386 A | 10/1995 | Knebelkamp |
| 5,485,435 A | 1/1996 | Matsuda et al. |
| 5,492,572 A | 2/1996 | Schroeder et al. |
| 5,495,221 A | 2/1996 | Post |
| 5,512,732 A | 4/1996 | Yagnik et al. |
| 5,570,084 A | 10/1996 | Ritter et al. |
| 5,582,522 A | 12/1996 | Johnson |
| 5,604,960 A | 2/1997 | Good |
| 5,631,093 A | 5/1997 | Perry et al. |
| 5,631,618 A | 5/1997 | Trumper et al. |
| 5,633,555 A | 5/1997 | Ackermann et al. |
| 5,635,889 A | 6/1997 | Stelter |
| 5,637,972 A | 6/1997 | Randall et al. |
| 5,730,155 A | 3/1998 | Allen |
| 5,759,054 A | 6/1998 | Spadafore |
| 5,788,493 A | 8/1998 | Tanaka et al. |
| 5,852,393 A | 12/1998 | Reznik et al. |
| 5,935,155 A | 8/1999 | Humayun et al. |
| 5,956,778 A | 9/1999 | Godoy |
| 5,983,406 A | 11/1999 | Meyerrose |
| 6,000,484 A | 12/1999 | Zoretich et al. |
| 6,039,759 A | 3/2000 | Carpentier et al. |
| 6,047,456 A | 4/2000 | Yao et al. |

(56) References Cited

U.S. PATENT DOCUMENTS

| | | |
|---|---|---|
| 6,072,251 A | 6/2000 | Markle |
| 6,074,420 A | 6/2000 | Eaton |
| 6,104,108 A | 8/2000 | Hazelton et al. |
| 6,115,849 A | 9/2000 | Meyerrose |
| 6,118,271 A | 9/2000 | Ely et al. |
| 6,120,283 A | 9/2000 | Cousins |
| 6,125,955 A | 10/2000 | Zoretich et al. |
| 6,142,779 A | 11/2000 | Siegel et al. |
| 6,170,131 B1 | 1/2001 | Shin |
| 6,187,041 B1 | 2/2001 | Garonzik |
| 6,188,147 B1 | 2/2001 | Hazelton et al. |
| 6,205,012 B1 | 3/2001 | Lear |
| 6,210,033 B1 | 4/2001 | Karkos, Jr. et al. |
| 6,224,374 B1 | 5/2001 | Mayo |
| 6,234,833 B1 | 5/2001 | Tsai et al. |
| 6,273,918 B1 | 8/2001 | Yuhasz et al. |
| 6,275,778 B1 | 8/2001 | Shimada et al. |
| 6,285,097 B1 * | 9/2001 | Hazelton et al. ........... 310/12.06 |
| 6,387,096 B1 | 5/2002 | Hyde, Jr. |
| 6,422,533 B1 | 7/2002 | Harms |
| 6,457,179 B1 | 10/2002 | Prendergast |
| 6,467,326 B1 | 10/2002 | Garrigus |
| 6,535,092 B1 | 3/2003 | Hurley et al. |
| 6,540,515 B1 | 4/2003 | Tanaka |
| 6,561,815 B1 | 5/2003 | Schmidt |
| 6,599,321 B2 | 7/2003 | Hyde, Jr. |
| 6,607,304 B1 | 8/2003 | Lake et al. |
| 6,652,278 B2 | 11/2003 | Honkura et al. |
| 6,653,919 B2 | 11/2003 | Shih-Chung et al. |
| 6,720,698 B2 | 4/2004 | Galbraith |
| 6,747,537 B1 | 6/2004 | Mosteller |
| 6,821,126 B2 | 11/2004 | Neidlein |
| 6,841,910 B2 | 1/2005 | Gery |
| 6,842,332 B1 | 1/2005 | Rubenson et al. |
| 6,847,134 B2 | 1/2005 | Frissen et al. |
| 6,850,139 B1 | 2/2005 | Dettmann et al. |
| 6,862,748 B2 | 3/2005 | Prendergast |
| 6,864,773 B2 | 3/2005 | Perrin |
| 6,913,471 B2 | 7/2005 | Smith |
| 6,927,657 B1 | 8/2005 | Wu |
| 6,936,937 B2 | 8/2005 | Tu et al. |
| 6,954,938 B2 | 10/2005 | Emberty et al. |
| 6,954,968 B1 | 10/2005 | Sitbon |
| 6,971,147 B2 | 12/2005 | Halstead |
| 7,009,874 B2 | 3/2006 | Deak |
| 7,016,492 B2 | 3/2006 | Pan et al. |
| 7,031,160 B2 | 4/2006 | Tillotson |
| 7,033,400 B2 | 4/2006 | Currier |
| 7,038,565 B1 | 5/2006 | Chell |
| 7,065,860 B2 | 6/2006 | Aoki et al. |
| 7,066,739 B2 | 6/2006 | McLeish |
| 7,066,778 B2 | 6/2006 | Kretzschmar |
| 7,097,461 B2 | 8/2006 | Neidlein |
| 7,101,374 B2 | 9/2006 | Hyde, Jr. |
| 7,135,792 B2 | 11/2006 | Devaney et al. |
| 7,137,727 B2 | 11/2006 | Joseph et al. |
| 7,186,265 B2 | 3/2007 | Sharkawy et al. |
| 7,224,252 B2 | 5/2007 | Meadow, Jr. et al. |
| 7,264,479 B1 | 9/2007 | Lee |
| 7,276,025 B2 | 10/2007 | Roberts et al. |
| 7,311,526 B2 | 12/2007 | Rohrbach et al. |
| 7,339,790 B2 | 3/2008 | Baker et al. |
| 7,344,380 B2 | 3/2008 | Neidlein et al. |
| 7,351,066 B2 | 4/2008 | DiFonzo et al. |
| 7,358,724 B2 | 4/2008 | Taylor et al. |
| 7,362,018 B1 | 4/2008 | Kulogo et al. |
| 7,364,433 B2 | 4/2008 | Neidlein |
| 7,381,181 B2 | 6/2008 | Lau et al. |
| 7,402,175 B2 | 7/2008 | Azar |
| 7,416,414 B2 | 8/2008 | Bozzone et al. |
| 7,438,726 B2 | 10/2008 | Erb |
| 7,444,683 B2 | 11/2008 | Prendergast et al. |
| 7,453,341 B1 | 11/2008 | Hildenbrand |
| 7,467,948 B2 | 12/2008 | Lindberg et al. |
| 7,498,914 B2 | 3/2009 | Miyashita et al. |
| 7,583,500 B2 | 9/2009 | Ligtenberg et al. |
| 7,637,746 B2 | 12/2009 | Lindberg et al. |
| 7,645,143 B2 | 1/2010 | Rohrbach et al. |
| 7,658,613 B1 | 2/2010 | Griffin et al. |
| 7,715,890 B2 | 5/2010 | Kim et al. |
| 7,762,817 B2 | 7/2010 | Ligtenberg et al. |
| 7,775,567 B2 | 8/2010 | Ligtenberg et al. |
| 7,796,002 B2 | 9/2010 | Hashimoto et al. |
| 7,799,281 B2 | 9/2010 | Cook et al. |
| 7,808,349 B2 | 10/2010 | Fullerton et al. |
| 7,812,697 B2 | 10/2010 | Fullerton et al. |
| 7,817,004 B2 | 10/2010 | Fullerton et al. |
| 7,828,556 B2 | 11/2010 | Rodrigues |
| 7,832,897 B2 | 11/2010 | Ku |
| 7,837,032 B2 | 11/2010 | Smeltzer |
| 7,839,246 B2 | 11/2010 | Fullerton et al. |
| 7,843,297 B2 | 11/2010 | Fullerton et al. |
| 7,868,721 B2 | 1/2011 | Fullerton et al. |
| 7,871,272 B2 | 1/2011 | Firman, II et al. |
| 7,874,856 B1 | 1/2011 | Schriefer et al. |
| 7,889,037 B2 | 2/2011 | Cho |
| 7,901,216 B2 | 3/2011 | Rohrbach et al. |
| 7,903,397 B2 | 3/2011 | McCoy |
| 7,905,626 B2 | 3/2011 | Shantha et al. |
| 7,982,568 B2 * | 7/2011 | Fullerton et al. .............. 335/306 |
| 7,997,906 B2 | 8/2011 | Ligenberg et al. |
| 8,002,585 B2 | 8/2011 | Zhou |
| 8,009,001 B1 | 8/2011 | Cleveland |
| 8,050,714 B2 | 11/2011 | Fadell et al. |
| 8,078,224 B2 | 12/2011 | Fadell et al. |
| 8,078,776 B2 | 12/2011 | Novotney et al. |
| 8,087,939 B2 | 1/2012 | Rohrbach et al. |
| 8,099,964 B2 | 1/2012 | Saito et al. |
| 8,138,869 B1 | 3/2012 | Lauder et al. |
| 8,143,982 B1 | 3/2012 | Lauder et al. |
| 8,143,983 B1 | 3/2012 | Lauder et al. |
| 8,165,634 B2 | 4/2012 | Fadell et al. |
| 8,177,560 B2 | 5/2012 | Rohrbach et al. |
| 8,187,006 B2 | 5/2012 | Rudisill et al. |
| 8,190,205 B2 | 5/2012 | Fadell et al. |
| 8,242,868 B2 | 8/2012 | Lauder et al. |
| 8,253,518 B2 | 8/2012 | Lauder et al. |
| 8,264,310 B2 | 9/2012 | Lauder et al. |
| 8,264,314 B2 | 9/2012 | Sankar |
| 8,271,038 B2 | 9/2012 | Fadell et al. |
| 8,271,705 B2 | 9/2012 | Novotney et al. |
| 8,297,367 B2 | 10/2012 | Chen et al. |
| 8,344,836 B2 | 1/2013 | Lauder et al. |
| 8,348,678 B2 | 1/2013 | Hardisty et al. |
| 8,354,767 B2 | 1/2013 | Pennander et al. |
| 8,390,411 B2 | 3/2013 | Lauder et al. |
| 8,390,412 B2 | 3/2013 | Lauder et al. |
| 8,390,413 B2 | 3/2013 | Lauder et al. |
| 8,395,465 B2 | 3/2013 | Lauder et al. |
| 8,398,409 B2 | 3/2013 | Schmidt |
| 8,435,042 B2 | 5/2013 | Rohrbach et al. |
| 8,454,372 B2 | 6/2013 | Lee |
| 8,467,829 B2 | 6/2013 | Fadell et al. |
| 8,497,753 B2 | 7/2013 | DiFonzo et al. |
| 8,514,042 B2 | 8/2013 | Lauder et al. |
| 8,535,088 B2 | 9/2013 | Gao et al. |
| 8,576,031 B2 | 11/2013 | Lauder et al. |
| 8,576,034 B2 | 11/2013 | Bilbrey et al. |
| 8,616,362 B1 | 12/2013 | Browne et al. |
| 8,648,679 B2 | 2/2014 | Lauder et al. |
| 8,665,044 B2 | 3/2014 | Lauder et al. |
| 8,665,045 B2 | 3/2014 | Lauder et al. |
| 8,690,582 B2 | 4/2014 | Rohrbach et al. |
| 8,702,316 B2 | 4/2014 | DiFonzo et al. |
| 8,734,024 B2 | 5/2014 | Isenhour et al. |
| 8,752,200 B2 | 6/2014 | Varshavsky et al. |
| 8,757,893 B1 | 6/2014 | Isenhour et al. |
| 8,770,857 B2 | 7/2014 | DiFonzo et al. |
| 8,774,577 B2 | 7/2014 | Benjamin et al. |
| 8,781,273 B2 | 7/2014 | Benjamin et al. |
| 2002/0125977 A1 | 9/2002 | VanZoest |
| 2003/0170976 A1 | 9/2003 | Molla et al. |
| 2003/0179880 A1 | 9/2003 | Pan et al. |
| 2003/0187510 A1 | 10/2003 | Hyde |

(56) References Cited

U.S. PATENT DOCUMENTS

| | | |
|---|---|---|
| 2004/0003487 A1 | 1/2004 | Reiter |
| 2004/0155748 A1 | 8/2004 | Steingroever |
| 2004/0244636 A1 | 12/2004 | Meadow et al. |
| 2004/0251759 A1 | 12/2004 | Hirzel |
| 2005/0102802 A1 | 5/2005 | Sitbon et al. |
| 2005/0196484 A1 | 9/2005 | Khoshnevis |
| 2005/0231046 A1 | 10/2005 | Aoshima |
| 2005/0240263 A1 | 10/2005 | Fogarty et al. |
| 2005/0263549 A1 | 12/2005 | Scheiner |
| 2006/0066428 A1 | 3/2006 | McCarthy et al. |
| 2006/0189259 A1 | 8/2006 | Park et al. |
| 2006/0198047 A1 | 9/2006 | Xue et al. |
| 2006/0214756 A1 | 9/2006 | Elliott et al. |
| 2006/0290451 A1 | 12/2006 | Prendergast et al. |
| 2006/0293762 A1 | 12/2006 | Schulman et al. |
| 2007/0072476 A1 | 3/2007 | Milan |
| 2007/0075594 A1 | 4/2007 | Sadler |
| 2007/0103266 A1 | 5/2007 | Wang et al. |
| 2007/0138806 A1 | 6/2007 | Ligtenberg et al. |
| 2007/0255400 A1 | 11/2007 | Parravicini et al. |
| 2007/0267929 A1 | 11/2007 | Pulnikov et al. |
| 2008/0119250 A1 | 5/2008 | Cho et al. |
| 2008/0139261 A1 | 6/2008 | Cho et al. |
| 2008/0174392 A1 | 7/2008 | Cho |
| 2008/0181804 A1 | 7/2008 | Tanigawa et al. |
| 2008/0186683 A1 | 8/2008 | Ligtenberg et al. |
| 2008/0218299 A1 | 9/2008 | Arnold |
| 2008/0224806 A1 | 9/2008 | Ogden et al. |
| 2008/0272868 A1 | 11/2008 | Prendergast et al. |
| 2008/0282517 A1 | 11/2008 | Claro |
| 2009/0021333 A1 | 1/2009 | Fiedler |
| 2009/0209173 A1 | 8/2009 | Arledge et al. |
| 2009/0250576 A1 | 10/2009 | Fullerton et al. |
| 2009/0251256 A1 | 10/2009 | Fullerton et al. |
| 2009/0254196 A1 | 10/2009 | Cox et al. |
| 2009/0278642 A1 | 11/2009 | Fullerton et al. |
| 2009/0289090 A1 | 11/2009 | Fullerton et al. |
| 2009/0289749 A1 | 11/2009 | Fullerton et al. |
| 2009/0292371 A1 | 11/2009 | Fullerton et al. |
| 2010/0033280 A1 | 2/2010 | Bird et al. |
| 2010/0126857 A1 | 5/2010 | Polwart et al. |
| 2010/0167576 A1 | 7/2010 | Zhou |
| 2011/0026203 A1 | 2/2011 | Ligtenberg et al. |
| 2011/0210636 A1 | 9/2011 | Kuhlmann-Wilsdorf |
| 2011/0234344 A1 | 9/2011 | Fullerton et al. |
| 2011/0248806 A1 | 10/2011 | Michael |
| 2011/0279206 A1 | 11/2011 | Fullerton et al. |
| 2012/0007704 A1 | 1/2012 | Nerl |
| 2012/0085753 A1 | 4/2012 | Fitch et al. |
| 2012/0235519 A1 | 9/2012 | Dyer et al. |
| 2013/0001745 A1 | 1/2013 | Iwaki |
| 2013/0186209 A1 | 7/2013 | Herbst |
| 2013/0186473 A1 | 7/2013 | Mankame et al. |
| 2013/0186807 A1 | 7/2013 | Browne et al. |
| 2013/0187538 A1 | 7/2013 | Herbst |
| 2013/0192860 A1 | 8/2013 | Puzio et al. |
| 2013/0207758 A1 | 8/2013 | Browne et al. |
| 2013/0252375 A1 | 9/2013 | Yi et al. |
| 2013/0256274 A1 | 10/2013 | Faulkner |
| 2013/0270056 A1 | 10/2013 | Mankame et al. |
| 2013/0305705 A1 | 11/2013 | Shivaram et al. |
| 2013/0341137 A1 | 12/2013 | Mandame et al. |
| 2014/0044972 A1 | 2/2014 | Menassa et al. |
| 2014/0072261 A1 | 3/2014 | Isenhour et al. |
| 2014/0152252 A1 | 6/2014 | Wood et al. |
| 2014/0205235 A1 | 7/2014 | Benjamin et al. |
| 2014/0221741 A1 | 8/2014 | Wang et al. |

FOREIGN PATENT DOCUMENTS

| | | |
|---|---|---|
| EP | 0 345 554 A1 | 12/1989 |
| EP | 0 545 737 A1 | 6/1993 |
| FR | 823395 | 1/1938 |
| GB | 1 495 677 A | 12/1977 |
| JP | 60-091011 U | 5/1985 |
| WO | WO-02/31945 A2 | 4/2002 |
| WO | WO-2007/081830 A2 | 7/2007 |
| WO | WO-2009/124030 A1 | 10/2009 |
| WO | WO-2010/141324 A1 | 12/2010 |

OTHER PUBLICATIONS

International Search Report and Written Opinion of the International Searching Authority issued in Application No. PCT/US2013/028095 dated May 13, 2013.

Mi, "Magnetreater/Charger Model 580" Magnetic Instruments Inc. Product specification, May 4, 2009, http://web.archive.org/web/20090504064511/http://www.maginst.com/specifications/580_magnetreater.htm, 2 pages.

United States Office Action issued in U.S. Appl. No. 13/104,393 dated Apr. 4, 2013.

United States Office Action issued in U.S. Appl. No. 13/236,413 dated Jun. 6, 2013.

United States office Action issued in U.S. Appl. No. 13/246,584 dated May 16, 2013.

United States Office Action issued in U.S. Appl. No. 13/374,074 dated Feb. 21, 2013.

United States Office Action issued in U.S. Appl. No. 13/470,994 dated Jan. 7, 2013.

United States Office Action issued in U.S. Appl. No. 13/530,893 dated Mar. 22, 2013.

United States Office Action issued in U.S. Appl. No. 13/855,519 dated Jul. 17, 2013.

United States Office Action issued in U.S. Appl. No. 13/470,994 dated Aug. 8, 2013.

United States Office Action issued in U.S. Appl. No. 13/430,219 dated Aug. 13, 2013.

BNS 33 Range, Magnetic safety sensors, Rectangular design, http://www.farnell.com/datasheets/36449.pdf, 3 pages, date unknown.

Series BNS, Compatible Series AES Safety Controllers, http://www.schmersalusa.com/safety_controllers/drawings/aes.pdf, pp. 159-175, date unknown.

Series BNS-B20, Coded-Magnet Sensorr Safety Door Handle, http://www.schmersalusa.com/catalog_pdfs/BNS_B20.pdf, 2pages, date unknown.

Series BNS333, Coded-Magnet Sensors with Integral Safety Control Module, http://www.schmersalusa.com/machine_guarding/coded_magnet/drawings/bns333.pdf, 2 pages, date unknown.

International Search Report and Written Opinion dated Jun. 1, 2009, directed to counterpart application No. PCT/US2009/002027. (10 pages).

International Search Report and Written Opinion, dated Apr. 8, 2011 issued in related International Application No. PCT/US2010/049410.

International Search Report and Written Opinion, dated Aug. 18, 2010, issued in related International Application No. PCT/US2010/036443.

International Search Report and Written Opinion, dated Jul. 13, 2010, issued in related International Application No. PCT/US2010/021612.

International Search Report and Written Opinion, dated May 14, 2009, issued in related International Application No. PCT/US2009/038925.

Pill-soo Kim, "A future cost trends of magnetizer systems in Korea", Industrial Electronics, Control, and Instrumentation, 1996, vol. 2, Aug. 5, 1996, pp. 991-996.

United States Office Action, dated Aug. 26, 2011, issued in counterpart U.S. Appl. No. 12/206,270.

United States Office Action, dated Feb. 2, 2011, issued in counterpart U.S. Appl. No. 12/476,952.

United States Office Action, dated Mar. 12, 2012, issued in counterpart U.S. Appl. No. 12/206,270.

United States Office Action, dated Mar. 9, 2012, issued in counterpart U.S. Appl. No. 13/371,280.

United States Office Action, dated Oct. 12, 2011, issued in counterpart U.S. Appl. No. 12/476,952.

(56) References Cited

OTHER PUBLICATIONS

Wikipedia, "Barker Code", Web article, last modified Aug. 2, 2008, 2 pages.
Wikipedia, "Bitter Electromagnet", Web article, last modified Aug. 2011, 1 page.
Wikipedia, "Costas Array", Web article, last modified Oct. 7, 2008, 4 pages.
Wikipedia, "Gold Code", Web article, last modified Jul. 27, 2008, 1 page.
Wikipedia, "Golomb Ruler", Web article, last modified Nov. 4, 2008, 3 pages.
Wikipedia, "Kasami Code", Web article, last modified Jun. 11, 2008, 1 page.
Wikipedia, "Linear feedback shift register", Web article, last modified Nov. 11, 2008, 6 pages.
Wikipedia, "Walsh Code", Web article, last modified Sep. 17, 2008, 2 pages.
United States Office Action issued in U.S. Appl. No. 13/529,520 dated Sep. 28, 2012.
Atallah et al., 2004, "Design, analysis and realisation of a high-performance magnetic gear", IEE Proc.-Electr. Power Appl., vol. 151, No. 2, Mar. 2004.
Atallah et al., D. 2001, "A Novel High-Performance Magnetic Gear", IEEE Transactions on Magnetics, vol. 37, No. 4, Jul. 2001, p. 2844-46.
Bassani, 2007, "Dynamic Stability of Passive Magnetic Bearings", Nonlinear Dynamics, V. 50, p. 161-68.
Boston Gear 221S-4, One-stage Helical Gearbox, http://www.bostongear.com/pdf/product_sections/200_series_helical.pdf, referenced Jun. 2010.
Chau et al., 2008, "Transient Analysis of Coaxial Magnetic Gears Using Finite Element Comodeling", Journal of Applied Physics, vol. 103.
Charpentier et al., 2001, "Mechanical Behavior of Axially Magnetized Permanent-Magnet Gears", IEEE Transactions on Magnetics, vol. 37, No. 3, May 2001, p. 1110-17.
Choi et al., 2010, "Optimization of Magnetization Directions in a 3-D Magnetic Structure", IEEE Transactions on Magnetics, vol. 46, No. 6, Jun. 2010, p. 1603-06.
Correlated Magnetics Research, 2009, Online Video, "Innovative Magnetics Research in Huntsville", http://www.youtube.com/watch?v=m4m81JjZCJo.
Correlated Magnetics Research, 2009, Online Video, "Non-Contact Attachment Utilizing Permanent Magnets", http://www.youtube.com/watch?v=3xUm25CNNgQ.
Correlated Magnetics Research, 2010, Company Website, http://www.correlatedmagnetics.com.
Furlani 1996, "Analysis and optimization of synchronous magnetic couplings", J. Appl. Phys., vol. 79, No. 8, p. 4692.
Furlani 2000, "Analytical analysis of magnetically coupled multiple cylinders", J. Phys. D: Appl. Phys., vol. 33, No. 1, p. 28-33.
Furlani 2001, "Permanent Magnet and Electromechanical Devices", Academic Press, San Diego, pp. 131-136.
General Electric DP 2.7 Wind Turbine Gearbox, http://www.gedrivetrain.com/insideDP27.cfm, referenced Jun. 2010.
Ha et al., 2002, "Design and Characteristic Analysis of Non-Contact Magnet Gear for Conveyor by Using Permanent Magnet", Conf. Record of the 2002 IEEE Industry Applications Conference, p. 1922-27.
Huang et al., 2008, "Development of a Magnetic Planetary Gearbox", IEEE Transactions on Magnetics, vol. 44, No. 3, p. 403-12.
Jian et al., "Comparison of Coaxial Magnetic Gears With Different Topologies", IEEE Transactions on Magnetics, vol. 45, No. 10, Oct. 2009, p. 4526-29.
Jian et al., 2010, "A Coaxial Magnetic Gear With Halbach Permanent-Magnet Arrays", IEEE Transactions on Energy Conversion, vol. 25, No. 2, Jun. 2010, p. 319-28.
Jørgensen et al., 2005, "Two dimensional model of a permanent magnet spur gear", Conf. Record of the 2005 IEEE Industry Applications Conference, p. 261-5.
Jørgensen et al., "The Cycloid Permanent Magnetic Gear", IEEE Transactions on Industry Applications, vol. 44, No. 6, Nov./Dec. 2008, p. 1659-65.
Krasil'nikov 2008, "Calculation of the Shear Force of Highly Coercive Permanent Magnets in Magnetic Systems With Consideration of Affiliation to a Certain Group Based on Residual Induction", Chemical and Petroleum Engineering, vol. 44, Nos. 7-8, p. 362-65.
Krasil'nikov 2009, "Torque Determination for a Cylindrical Magnetic Clutch", Russian Engineering Research, vol. 29, No. 6, pp. 544-47.
Liu et al., 2009, "Design and Analysis of Interior-magnet Outer-rotor Concentric Magnetic Gears", Journal of Applied Physics, vol. 105.
Lorimer et al., A., 1997, "Magnetization Pattern for Increased Coupling in Magnetic Clutches", IEEE Transactions on Magnetics, vol. 33, No. 5, Sep. 1997.
Mezani et al., 2006, "A high-performance axial-field magnetic gear", Journal of Applied Physics vol. 99.
Neugart PLE-160, One-Stage Planetary Gearbox, http://www.neugartusa.com/ple_160_gb.pdf, referenced Jun. 2010.
Tsurumoto 1992, "Basic Analysis on Transmitted Force of Magnetic Gear Using Permanent Magnet", IEEE Translation Journal on Magnetics in Japan, Vo 7, No. 6, Jun. 1992, p. 447-52.
C. Pompermaier, L. Sjoberg, and G. Nord, Design and Optimization of a Permanent Magnet Transverse Flux Machine, XXth International Conference on Electrical Machines, Sep. 2012, p. 606, IEEE Catalog No. CFP1290B-PRT, ISBN: 978-1-4673-0143-5.
V. Rudnev, An Objective Assessment of Magnetic Flux Concentrators, Het Trating Progress, Nov./Dec. 2004, p. 19-23.

* cited by examiner

MAGNETIC SHEAR FORCE TRANSFER DEVICE

CLAIMING BENEFIT OF PRIOR FILED U.S. APPLICATIONS

This Nonprovisional Patent Application claims the benefit of U.S. Provisional Patent Application 61/573,462, filed Sep. 6, 2011, titled "High Torque Magnetic Gears".

GOVERNMENT RIGHTS

This invention was made with government support under contract number N00014-11-M-0150 awarded by the Office of Naval Research. The government has certain rights in the invention.

FIELD OF THE INVENTION

The present invention relates generally to a magnetic shear force transfer device. More particularly, the present invention relates to magnetic shear force transfer devices comprising multi-pole correlated magnetic structures that enable couplings and gears having high ratios of torque to magnetic material volume.

BACKGROUND OF THE INVENTION

The shortcomings of traditional mechanical couples and gears are often overlooked since they are ubiquitous and frequently represent the only means of getting the right torque and rotation speed from, as an example, a motor to a propeller shaft. Gear teeth run into and rub against one another. This wastes energy, generates heat, emits vibration and sound, generates abrasive particles, wears gear teeth, makes lubrication essential, limits the service life of gears, and necessitates maintenance. In addition, incorporating fluid flow, maintenance access and heat transfer characteristics increases the complexity and cost of gears and transmissions. A gear that operated with interlocking magnetic fields, on the other hand, would not require physical contact between teeth. Despite a long list of potential advantages, magnetic couples and gears have heretofore been extremely limited in their application by their low torque densities (i.e., torque per volume of couple or gear mechanism). Higher torque densities would translate directly into broader applications for magnetic gears and couples.

SUMMARY OF THE INVENTION

Briefly, according to one embodiment of the invention, a magnetic shear force transfer device for transferring shear forces across a non-magnetic gap includes a first magnetic structure comprising a first plurality of magnetic sources magnetically printed into a first magnetizable material in accordance with a first pattern and a second magnetic structure comprising a second plurality of magnetic sources magnetically printed into a second magnetizable material in accordance with a second pattern. The first and second patterns define the print location and polarity of each magnetic source of the first and second pluralities of magnetic sources. The first pattern corresponds to a first plurality of concentric circular tracks and the second pattern corresponds to a second plurality of concentric circular tracks. Each concentric circular track of the first plurality of concentric circular tracks has an even number of magnetic sources and each concentric circular track of the second plurality of concentric circular tracks has an even number of magnetic sources. Adjoining magnetic sources alternate in polarity in each circular track of said first plurality of concentric circular tracks and said plurality of concentric circular tracks. One or more tracks of the first plurality of concentric circular tracks are rotated relative to one or more tracks of the second plurality of concentric circular tracks such that a maximum torque condition coincides to one angular orientation between the first and second magnetic structures.

In accordance with one aspect of the invention, the distances between print positions of adjoining magnetic sources and the amounts of magnetizing current used to generate H fields that create adjoining opposite polarity B fields in said first and second magnetizable material are selected to produce a desired force profile that may correspond to a force versus distance curve or a torque versus a rotation of said first magnetic structure relative to said second magnetic structure.

Shear forces can be transferred as torque and the non-magnetic gap can be an air gap.

A first shunt plate can be positioned on a back side of the first magnetic structure and a second shunt plate can be positioned on a back side of the second magnetic structure.

An intermediate layer can be located between the first magnetic structure and the second magnetic structure, where the intermediate layer is a non-magnetic material.

In accordance with a second embodiment of the invention, a method for manufacturing a magnetic shear force transfer device for transferring shear forces across a non-magnetic gap includes producing a first magnetic structure by magnetically printing a first plurality of magnetic sources into a first magnetizable material in accordance with a first pattern and producing a second magnetic structure by magnetically printing a second plurality of magnetic sources into a second magnetizable material in accordance with a second pattern, where the first and second patterns define the print location and polarity of each magnetic source of said first and second pluralities of magnetic sources. The first pattern corresponds to a first plurality of concentric circular tracks and the second pattern corresponds to a second plurality of concentric circular tracks. Each concentric circular track of said first plurality of concentric circular tracks has an even number of magnetic sources and each concentric circular track of said second plurality of concentric circular tracks has an even number of magnetic sources. Adjoining magnetic sources alternate in polarity in each circular track of said first plurality of concentric circular tracks and said second plurality of concentric circular tracks. One or more tracks of the first plurality of concentric circular tracks are rotated relative to one or more tracks of the second plurality of concentric circular tracks such that a maximum torque condition coincides to one angular orientation between said first and second magnetic structures.

The method may also include determining a desired distance between print positions of adjoining magnetic sources and desired amounts of magnetizing current used to generate H fields that create adjoining opposite polarity B fields in a magnetizable material that produce a desired force profile, wherein distances between print positions of adjoining magnetic sources substantially correspond to the desired distance and the amounts of magnetizing current used to generate H fields that create adjoining opposite polarity B fields in said first and second magnetizable material substantially correspond to the desired amounts of magnetizing current.

The shear forces are transferred as torque.

The non-magnetic gap is an air gap.

The desired force profile corresponds to a force versus distance curve or to a torque versus a rotation of said first magnetic structure relative to said second magnetic structure.

The method may include providing a first shunt plate on a back side of the first magnetic structure and providing a second shunt plate on a back side of the second magnetic structure.

The method may also include providing an intermediate layer between the first magnetic structure and the second magnetic structure, where the intermediate layer is a non-magnetic material.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art.

The behavior of magnets is well understood and, aside from materials improvements such as rare-earth materials, magnets have been used in much the same way for the more than a century. During this time, machines have been designed to work with the fixed behavior of permanent magnets that have a North Pole and a South Pole, where the field magnitude decreases with the square of the separation distance between two magnets.

Larry Fullerton, a prolific inventor and founder of Correlated Magnetics Research (CMR), made a series of discoveries in magnetism beginning in 2008. Those discoveries and later inventions stemmed from his application of signal processing and coding theories to magnetic structures such as is described in U.S. Pat. No. 8,179,219, which is incorporated herein by reference. Fullerton discovered that magnetic fields interfere in space similar to the way radio signals, or sound, interfere. He further discovered that geometric patterns of mixed magnetic poles (each called a maxel, for magnetic pixel) create many new behaviors. A multi-pole correlated magnetic structure, trademarked by CMR as a "Polymagnet®", can be designed or "programmed" to have desired functionality, instead of applications being designed around the limited functionality of conventional magnets. For an example of how signal processing brings new functionality to magnets, one can consider Barker codes (http://en.wikipedia.org/wiki/Barker_code), which refers to a family of codes traditionally used to define communications and radar radio frequency (RF) signals that constructively interfere only when the signals are precisely in phase, or in other words, when they are correlated. When Barker codes or other such codes having desirable autocorrelation properties are emulated in multi-pole magnetic structures, "constructive interference" becomes attraction (or repulsion) forces that are present between the structures only when they are aligned.

Figure 1:
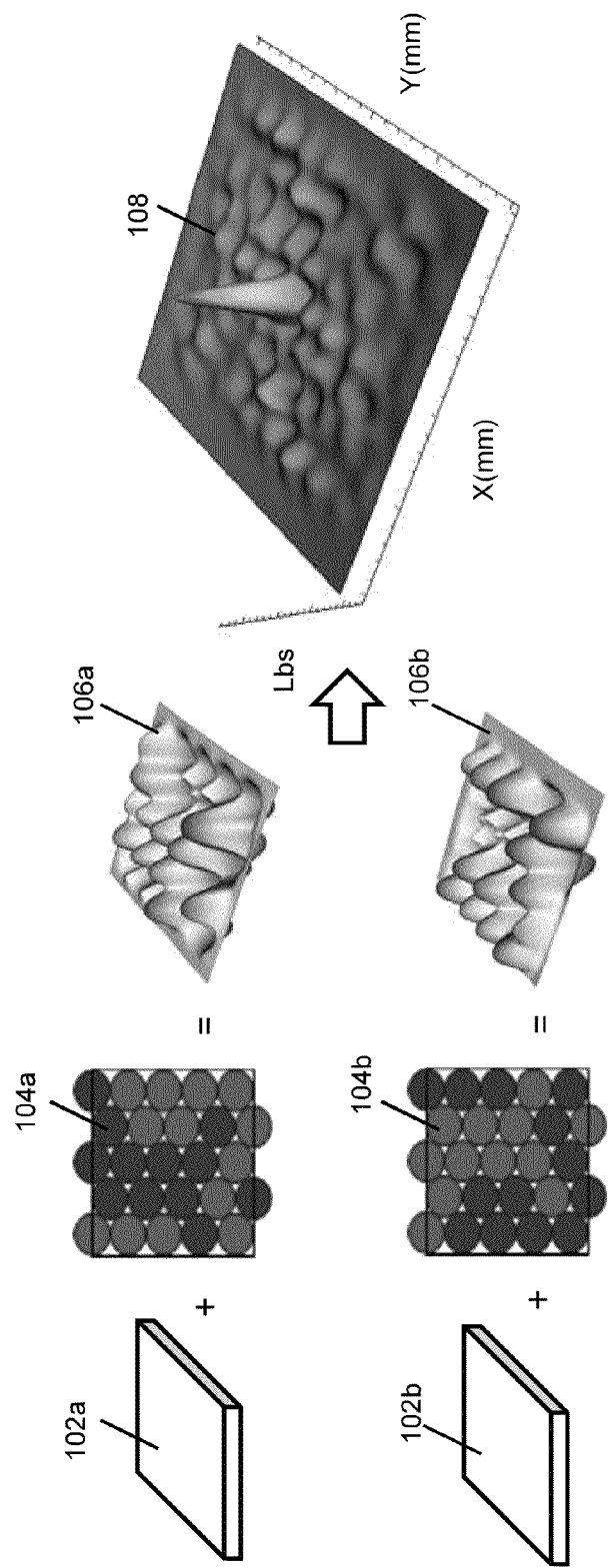
FIG. 1 depicts exemplary complementary two dimensional codes and corresponding field scans and spatial force function.

A two-dimensional code would constructively interfere with correlation in two dimensions simultaneously. Such a code has been printed into the surface of magnetic material 102a 102b to produce a pair of magnetic structures where constructive interference refers to force between the structures and correlation translates to spatial alignment of the magnetic structure pair. FIG. 1 illustrates codes A 104a and A' 104b (shown as patterns of light and dark colored circles that represent "North up" and "South up" polarity maxels), the complex fields 106a 106b resulting from magnetizing the codes 104a 104b into permanent magnet substrates 102a 102b and finally the spatial force function 108 corresponding to relative alignments of the two magnetic structures magnetized in accordance with code A and complementary (mirror image) code A', respectively. The peak spatial force in the center of the spatial force function 108 corresponds to the strong attracting force that is only produced when the magnetic structures are aligned. For other alignments, attract and repel forces are produced that substantially cancel. This is one example of many different spatially-dependent behaviors that can be programmed into magnetic material. The principle codes and magnetic fields also extend to arrays of electro-magnets or electro-permanent magnets, which enable complex magnetic fields to vary with time.

Figure 2:
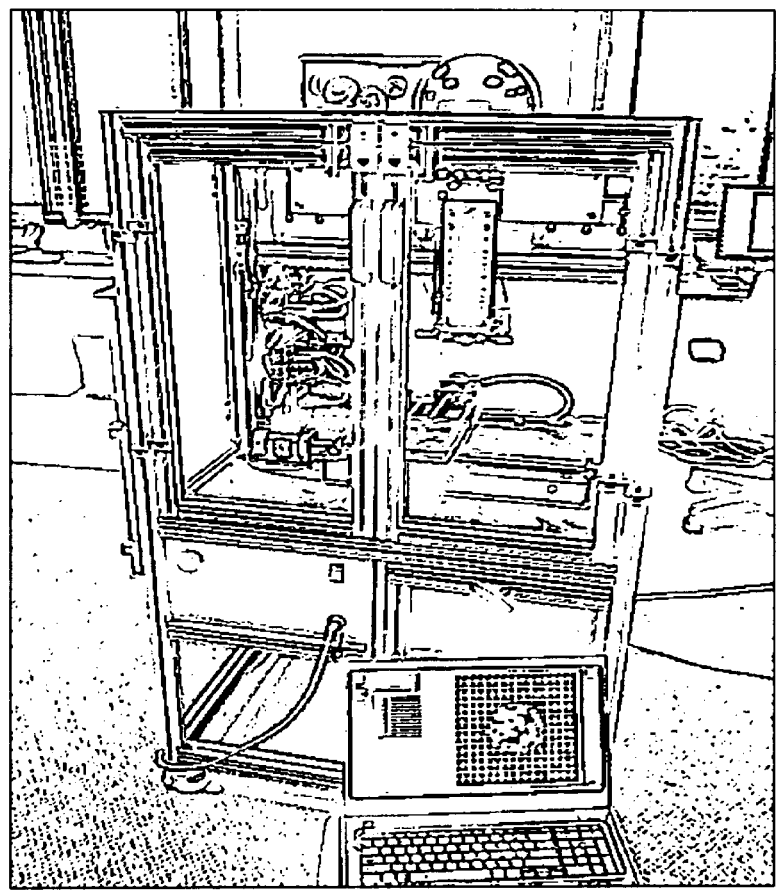
FIG. 2 depicts an exemplary magnetic printer.

To provide a sense of the state of magnetization technology development, a magnetization pattern of 120 2 mm outside diameter (OD) maxels can be printed into a standard N42, 1/8" thick 1.5" OD disc of Neodymium Iron Boron at room temperature in 10 to 15 seconds. CMR's, 4$^{th}$ Generation magnetic printer trademarked MagPrinter™ is shown in FIG. 2. Planned improvements in machine architecture, positioning and electronics are expected to reduce the "printing" time by an order of magnitude. This meso-scale (currently down to 500 μmaxels) magnetization process has been successfully tested in a variety of permanent magnet materials, where one skilled in the art will understand that to have high field gradients (meaning closely spaced maxels) and low temporal variation (for NIB, magnetization degausses at a rate of approximately 0.5% per decade), then high-coercivity materials are important. The fundamentals of the magnetization circuitry of the MagPrinter are described in U.S. Pat. No. 8,179,219.

A collection of magnetization technologies trademarked MaxField® have been developed by CMR that allow Polymagnets to be optimized for tensile force achieving a 500% mated force increase over conventional, un-coded pairs of magnets of the same material and size. These techniques specifically involve using a magnetizing circuit to magnetically print (i.e., spot magnetize) maxels into a particular grade and thickness of magnetizable material where an amount of magnetizing current is selected to produce an H field required to produce a B field in the magnetizable material such that adjoining opposite polarity maxels having a selected spacing will have a desired force profile. More generally, the strength of the magnetizing field and the maxel spacing can be selected based on the properties of the material being magnetized to achieve desired tensile and/or shear force profiles of adjoining opposite polarity maxels where force curves can be designed in multiple directions and along complex three-dimensional paths. For a latching device, higher forces provide the same performance with less magnetic material, or an opportunity to upgrade lower energy-product magnetic materials to replace rare-earth materials. As outlined in detail below, the CMR technologies support similar improvements in magnetic shear forces. These magnetization and related coding techniques are disclosed in U.S. patent application Ser. No. 13/240,355, filed Sep. 22, 2011, U.S. patent application Ser. No. 13/374,074, filed Dec. 9, 2011, and U.S. patent application Ser. No. 13/481,554, filed May 25, 2012, which are incorporated by reference herein in their entirety.

Other Polymagnets made to date include those that hover (trademarked HoverField® magnets), have tensile forces that fall to zero with certain rotations, align with low-micron (down to nanometer level) precision, and combine precise tensile forces, shear forces, and alignment functions into single magnet pairs. The CMR technologies introduce many new variables into the design of magnetic structures and machines. Maxels can have different sizes, shapes, polarities, dipole orientations, saturation levels and can be printed in many magnetic materials or formed from electromagnetic coils. The number of different maxel combinations is almost unlimited. More information about Correlated Magnetics Research's technology can be found on the company's web site: www.correlatedmagnetics.com.

CMR submitted a proposal and was awarded a Phase I Small Business Innovative Research (SBIR) contract to create improvements in shear forces and force densities between magnets using technologies invented by CMR. The proposal listed two goals: 1) quantify the potential of maxel arrays to increase the shear force between two magnetic structures and to improve the shear force to displacement curve, and 2) create maxel arrays that improve the torque/displacement curve by creating steeper torque onset and explore the potential for tailored torque/displacement behavior. The project included an extensive modeling effort aimed at understanding the nature of shear forces between magnets and magnetization patterns (sometimes also referred to as 'codes' or 'arrays') that provide high forces and force densities. This led to an exploration of the limits of magnetic torque transfer devices. The project was focused on devices that transfer forces directly between permanent magnets and not through modulating iron (like magnetic "shutter" gears) or via electromagnets. This project also resulted in the present invention.

The shear forces between magnets provide the dominant factor determining the torque density of magnet-to-magnet torque transfer devices. For couples (1:1 magnetic gears), the torque density is proportional to the shear area density between the magnets. The following equations, 1) illustrate how the torque density (T/V) is proportional to shear area density, or shear stress (τ) for disk-to-disk and concentric cylinder architectures, respectively. For the disk-to-disk equation 't' refers to the thickness across both plates and 'r' to their radii.

$$(T/V)_{discs} \propto \frac{2\tau r}{t} \qquad 1)$$

$$(T/V)_{cylinders} \propto 2\tau$$

Clutches are similar to magnetic couples and represent an important benchmark for their performance Carbon-carbon clutches used in various racing applications can provide a maximum of 100N of shear force for each square cm of plate area.

The shutter gear described by Atallah [IEEE Proc.-Electr. Power Appl., Vol. 151, No. 2, March 2004] has a torque density of 78 kN-m/m^3 as built (111 kN-m/m^3 as modeled). This corresponds to a shear area density (shear stress) of 3.9 N/cm^2 (5.5 N/cm^2 as modeled) at the low speed surface and is the highest experimentally verified torque-density magnetic gearbox that has been described in the literature.

The project objective was to produce a device that exceeds these numbers. CMR achieved this objective by developing a magnetic coupling that set a new standard for shear forces and torque densities.

A magnetic shear force transfer device according to the present invention includes a first magnetic structure comprising a first plurality of magnetic sources arranged in accordance with a first polarity pattern and a second magnetic structure comprising a second plurality of magnetic sources arranged in accordance with a second polarity pattern. Preferred embodiments of such a shear force transfer device include co-axial cylinders and pairs of concentric disks with gaps that can be substantially thinner than the magnetic materials. In a preferred embodiment comprising a pair of concentric disks, the first pattern and second pattern each comprise a plurality of concentric tracks each having an even number of magnetic source positions. In such an embodiment, the magnetic sources in the tracks of one magnet in the pair can be rotated so that all tracks reach a maximum torque condition at the same angular position, thereby creating a maximum torque for the structure. Angular shifting of the tracks can also be used to tune the maximum torque between the first and second magnetic structures or to control the angular stiffness between them. Other relevant variables available to tune the torque and torque curve include the distance between magnetic source positions of the first and second patterns, the size or strength of the magnetic sources and the shapes of the tracks. More generally, magnetic sources can be organized into a wide variety of patterns that can produce a wide variety of torque profiles between the first and second magnetic structures. In one embodiment, the pattern is selected to substantially match a preferred distance determined to produce a maximum force between adjoining opposite polarity magnetic sources. The distance between the center-line of adjacent tracks of the first and second patterns can also be selected to match the preferred distance.

Figure 3:
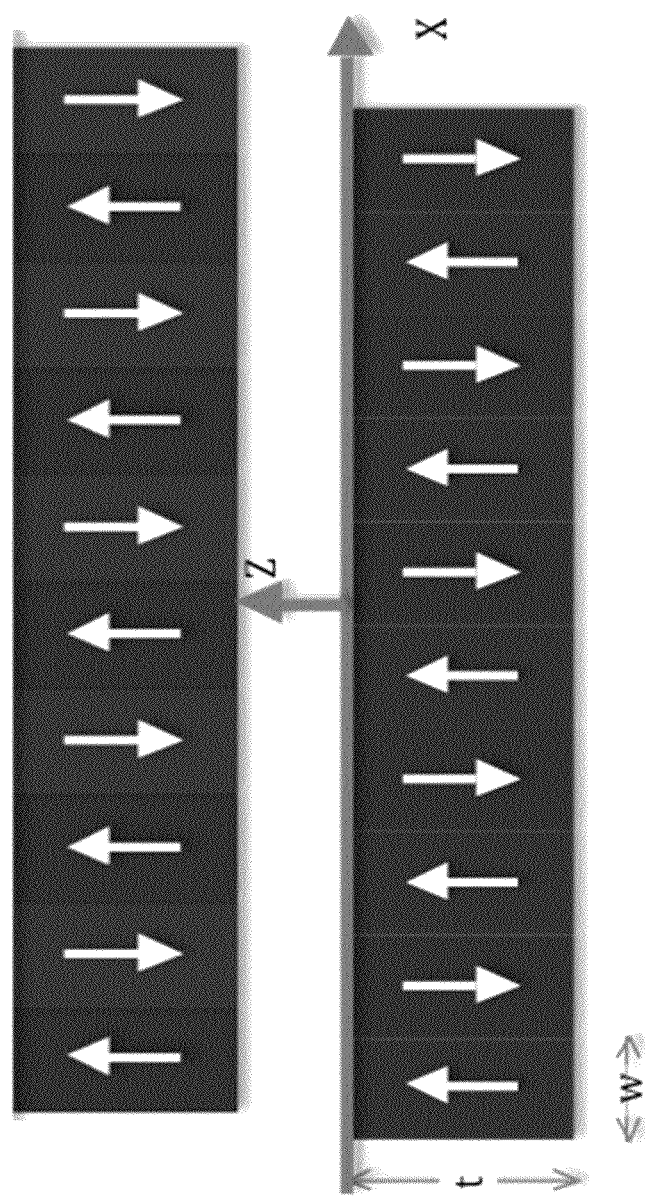
FIG. 3 depicts an exemplary alternating block pattern.

The first and second magnetic structures of the present embodiment are referred to herein as plates or discs. Much of the disclosure describes a horizontal orientation of two plates such as shown in FIG. 3, where one plate is called the upper plate and the other is called the lower plate. In this orientation the plates may also be called the top and bottom plates. One skilled in the art will understand that two such plates can be in an orientation other than a horizontal orientation, other than a co-axial orientation and other than a concentric orientation. For example, the two plates can be in a vertical orientation in which case the two plates might be referred to as the left plate and the right plate. As additional examples, the plates could have a non-uniform gap between them due to an angle between their axes or the plates could be offset a distance parallel to the gap between them. Furthermore, the plates are described herein as being circular discs since the SBIR primary application of interest involved magnetic couplings such as those that would be used in a rotating motor shaft. But, other movements such as a translational movement and other shapes such as rings, rectangular shapes, octagonal shapes, or other desired shapes are certainly possible. Furthermore, the exemplary magnetic couplings described herein have flat surfaces but other shaped surfaces are possible such as convex surfaces, concave surfaces, complex surfaces, compound surfaces, intermeshed surfaces, interdigitated surfaces and the like. Magnetic structures may comprise one or more pieces of magnetizable material which may include holes of various shapes or other materials present for spacing, structural, thermal, aesthetic or other purposes. The magnetic structures may have shunt plates or other magnetically active components on their back sides (i.e., the sides of the structures opposite the sides that are interfacing). One or more intermediate layers, for example a non-magnetic layer, may be configured between two interfacing magnetic structures.

Correlated Magnetic Coupling Development Overview

As part of the project, a variety of magnetic torque transfer devices in both patent and academic literature were reviewed. The purpose of this work was to establish benchmarks in terms of torque density performance and in terms of assembly and architecture guidelines.

To guide both the modeling and experimental portions of this project, several sources were reviewed to understand the fundamental nature of magnetic forces, and especially shear forces between magnetic structures. The main source was Furlani's "Permanent Magnet and Electromechanical Devices", [2] since the charge model, p. 132, relates magnetization, emitted fields and forces between permanent magnets together.

Prior to the SBIR project, CMR developed an internal modeling software system to support the development of maxel patterns and the analysis of various magnetic structures. CMR's modeling software was used to support the development of appropriate maxel patterns for high shear and high torque magnets. CMR also used the Ansys Maxwell electromagnetic field simulation software.

The modeling work performed during this project was focused on the scaling of substrate thickness, feature size and aspect ratio, and magnetization patterns in terms of their influence the shear forces between magnets. The work focused on three main magnetization patterns: alternating blocks, a one-sided field structure formed from an array of triangles and a one-sided field structure consisting of a continuously rotating magnetization vector. Preliminary work was also directed toward examining the performance of maxel arrays.

The first modeling study used software developed by CMR to assemble substrates (digitally) from arrays of bars with alternating polarity aligned in the 'z' direction such as in FIG. 3, which depicts two plates having an alternating block pattern. The top plate would initially be aligned with the lower plate (in 'x') and offset a distance away in 'z'. Shear forces are set up by a displacement in 'x'. In some of the models described below this displacement is achieved by a phase shift in 'x' to leave the area directly between the two plates constant. For all of the magnetization patterns described below, the term "feature size" represents the fundamental dimension of the pattern. In the 'alternating block' pattern illustrated in FIG. 3, the feature size is the width of a single block, 'w'.

The blocks had different cross section ratios (in width 'w' versus thickness 't') as viewed in the X-Z plane. The individual bars extended in the Y direction (into the page) to create square substrates. The shear forces versus displacement were calculated for different aspect ratios (t/w) of these blocks.

The next set of experiments focused on how the shear force varied with the feature size. The term feature size refers here to the width of the blocks, 'w'. A square substrate 96 mm on a side was built from blocks with equal width and thickness. The blocks modeled were 8, 4, 2, 1 and 0.5 mm thick.

A similar scaling study was also performed using the Maxwell modeling software. Maxwell includes ferromagnetism, permeability and other magnetic material details that have not been integrated into the internally developed CMR software.

Figure 4:
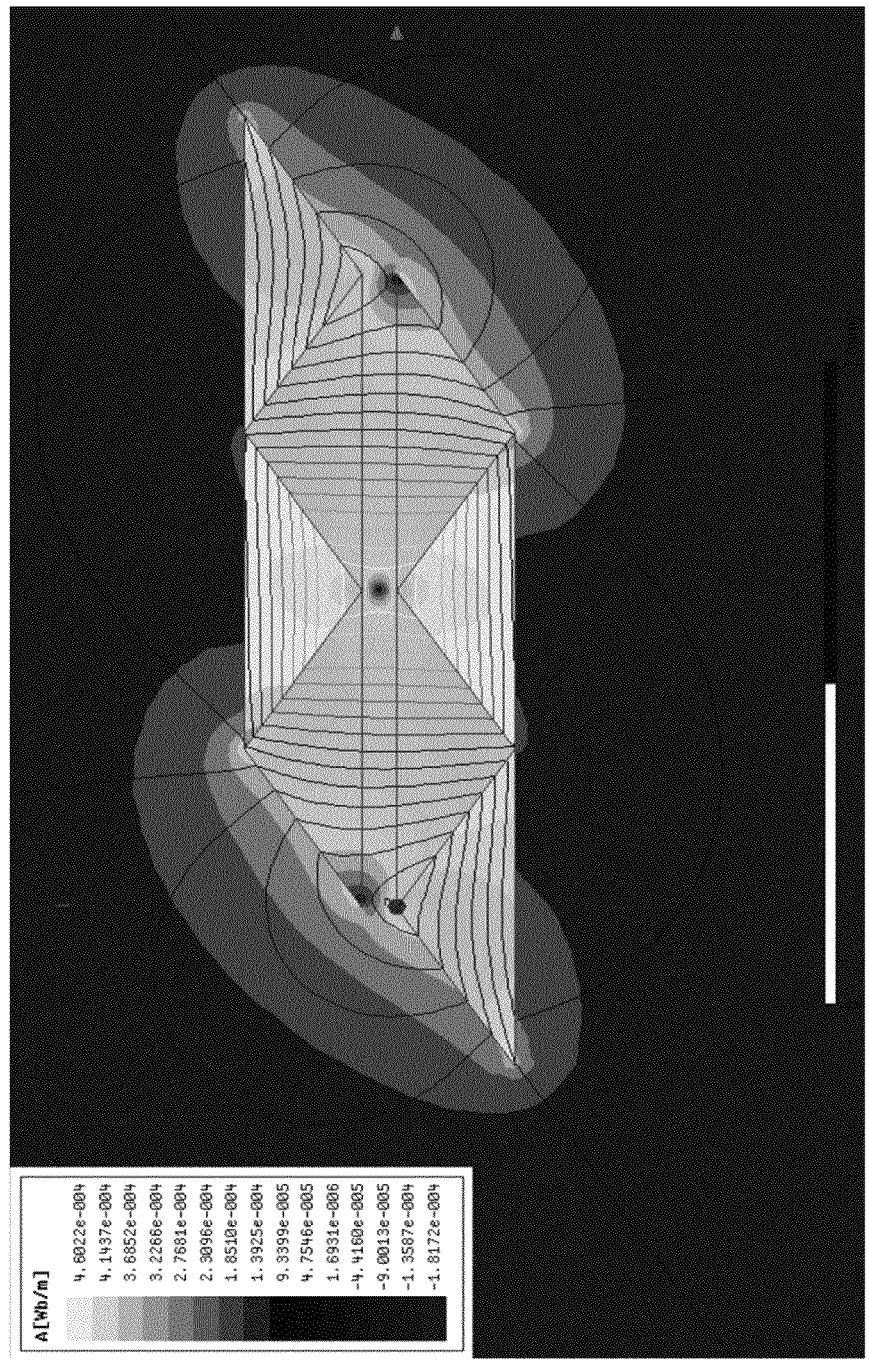
FIG. 4 depicts an exemplary triangle pattern.

A 2D shear simulation of a well-known one-sided field emission structure having a triangle pattern, often emulated in refrigerator magnets, was assembled in Maxwell and is illustrated in FIG. 4. The magnetization vectors of the triangles with bases touching the active surface (the one emitting the field) are orthogonal to the surface and of alternating direction (in and out). The triangles with bases on the back surface also have alternating magnetization vectors—they point toward the outbound oriented front-side triangles and away from those with inbound orientations. In this study, the feature size was set to the width of the triangle bases and the ratios of triangle bases to triangle heights, which is also the substrate thickness, were explored. For consistency with the other models, the widths chosen were 1 mm, 2 mm, 4 mm, and 8 mm and the substrates were 96 mm across (in 'x'). In this model, however, the focus was on exploring the dependence of the ratio of the triangle widths to their heights. Ratios of 0.25 to 3 were examined using the model.

The next 2D model was setup only within the Maxwell software. It used a series of thin slices of material to approximate a substrate with a continuously rotating magnetization vector. The vector rotates counter-clockwise with increasing 'x'. This model was used to explore the effect of a magnetization profile that was expected to have exceptional shear performance. To align with the other modeling efforts, the substrate was built to extend 96 mm in 'x', wavelengths of 1, 2, 4, and 8 mm were examined with the substrate thickness set to equal the wavelength. Instead of moving the top plate, which inherently changes the areas that are interacting in shear, the phase of the magnetization vector was shifted to a reach a maximum shear condition.

Figure 5:
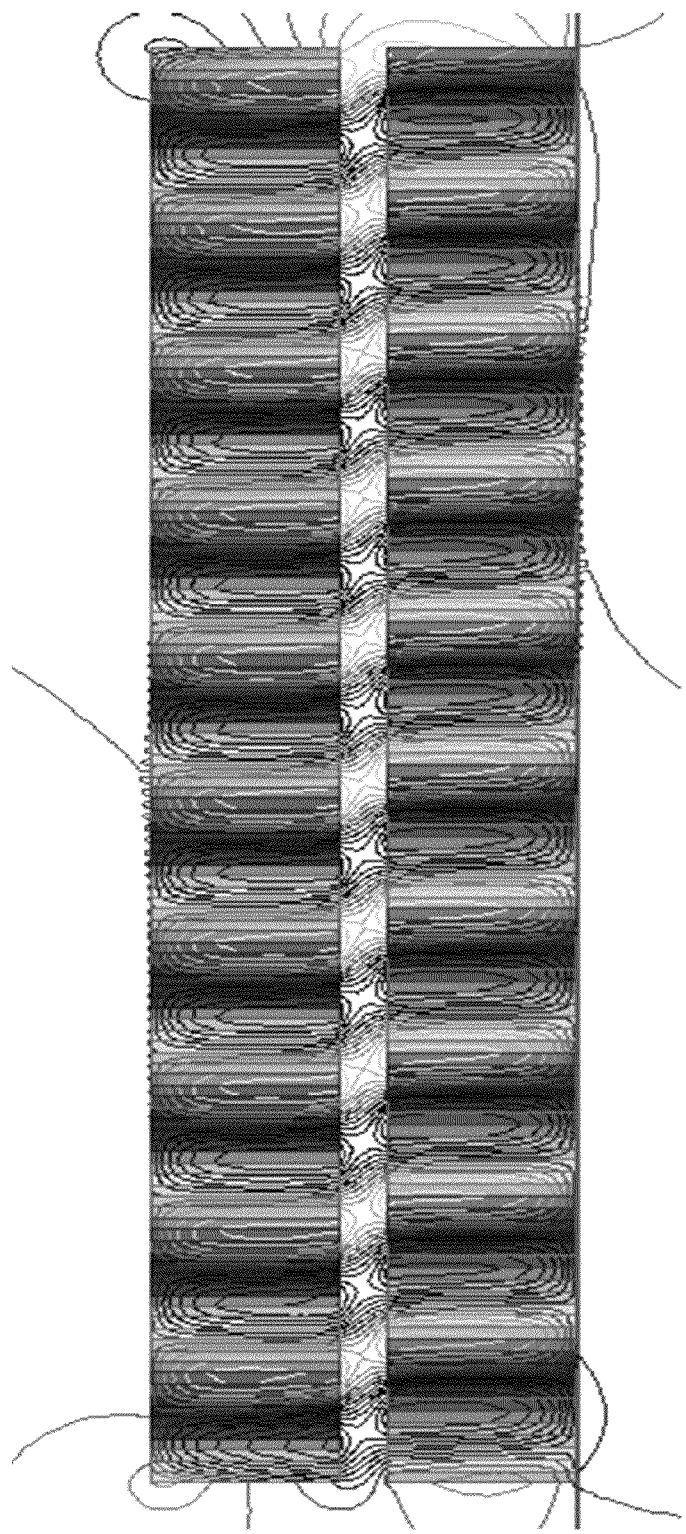
FIG. 5 depicts an exemplary continuously varying field structure.

FIG. 5 illustrates the setup of the continuously varying field structure model and the field lines emitted by the structures, which are nearly confined to the region between the plates. The offset between the plates is relatively large in this figure and they are shown in a maximum shear condition.

Figure 6:
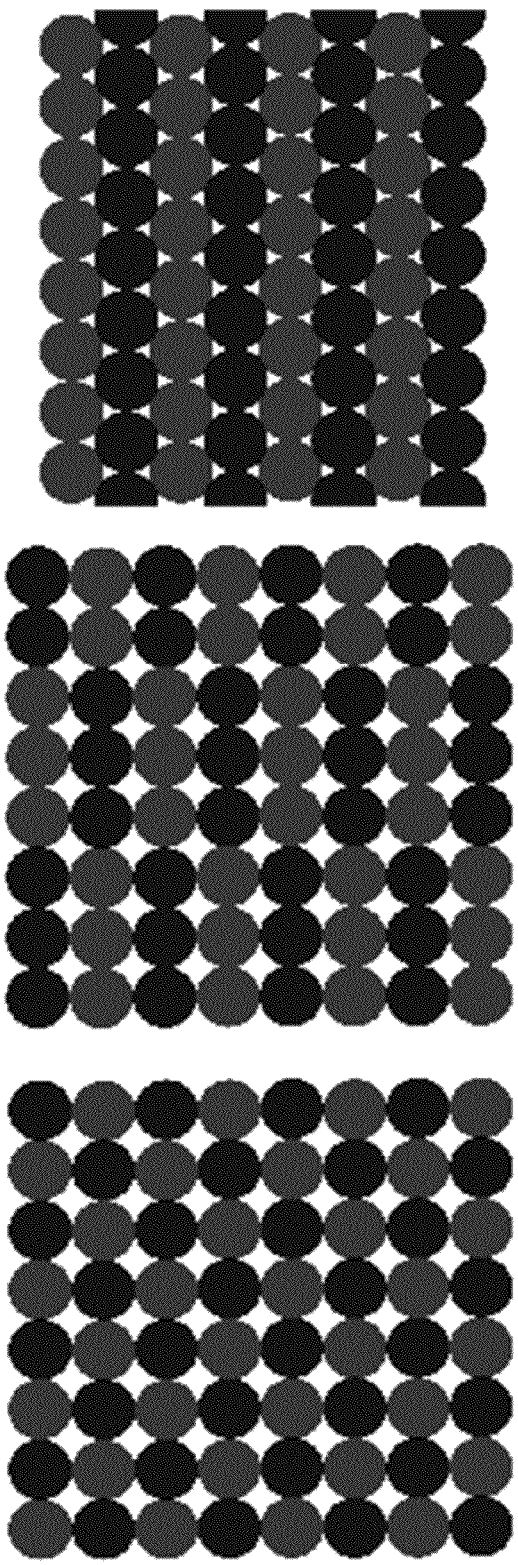
FIG. 6 depicts three exemplary maxel patterns.

A variety of maxel patterns were "printed" (using CMR's proprietary MagPrinter magnetization tool) into nickel-plated N42 NIB material and most were 1" square magnets ⅛" thick. The shear forces were tested over a variety of offsets and displacements with an emphasis on understanding the effects of spatial frequency in 'x' and in 'y'. FIG. 6 illustrates three codes that were examined during the experimental work. The MF (or MaxField) code resembles a checkerboard pattern. The 31 code has in one direction alternating groups of three maxels of the same polarity and in a perpendicular direction has alternating single maxels. The MS code is a MaxField stripe pattern where the maxels of each stripe are shifted by a half maxel width from each other.

Figure 7:
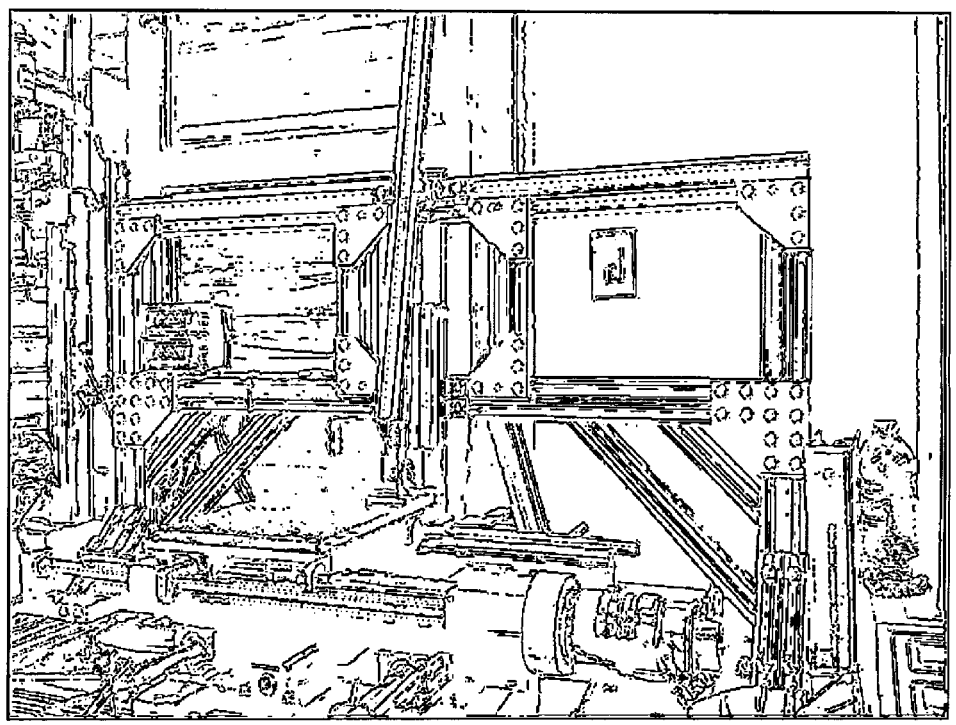
FIG. 7 depicts an exemplary shear test apparatus.
Figure 8:
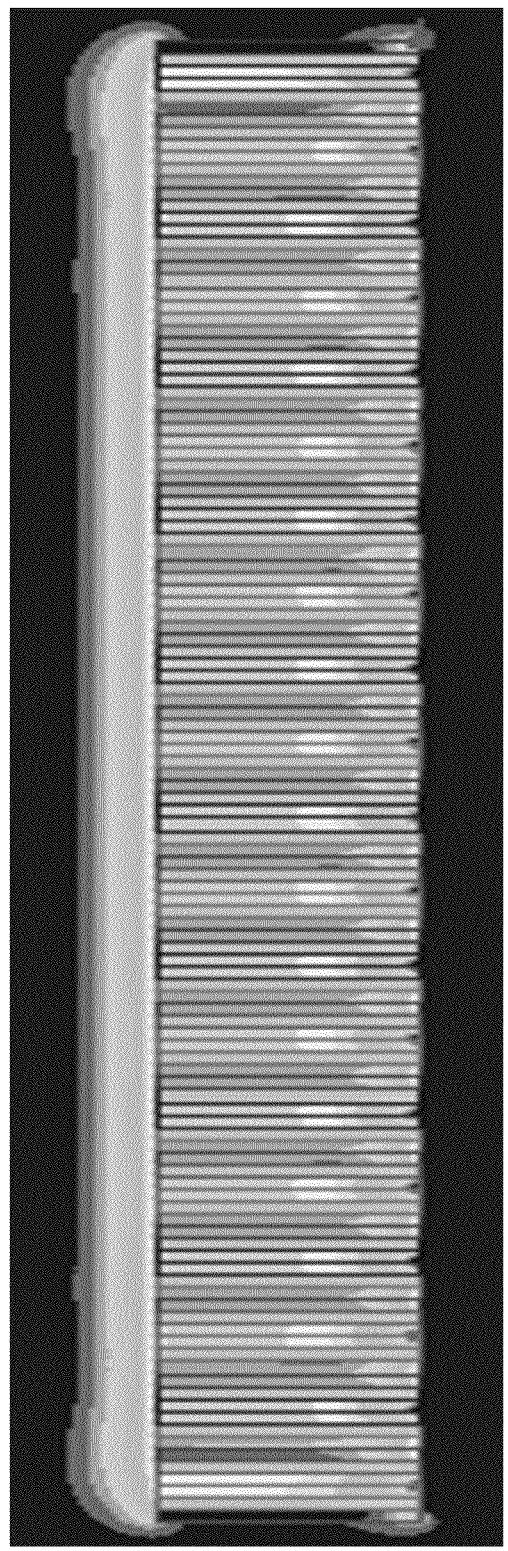
FIG. 8 depicts filed intensity around the continuously varying pattern.

A shear force test apparatus is shown in FIG. 7. A 50 lb. bending-bar sensor can be seen toward the center of the image and an X-Y table was used to move the magnets from left to right during shear force tests.

The results of the experimental magnetic shear force work were used to build high-torque codes for disk-to-disk couples. For these devices, ⅛" thick×3" OD N42 NIB magnets were used for the disks. In addition, a torque demonstration fixture was designed and built to help examine the performance of the couple magnets.

Magnetic Coupling Development Results and Conclusions

The nature of force development in magnetic coupling is a good starting point for understanding the shear force densities of unique magnetization patterns, since a coupling is a magnetic gear with a 1:1 transmission ratio. Lorimer, 1997 [3] analyzes the influence of magnetization patterns and shows that non-uniform patterns can produce higher torque than uniformly magnetized poles. No other references to shear force/torque development in non-uniformly magnetized couplings were found during this project.

Many types of magnetic gears have been invented involving conventional (i.e., uncoded) magnets and electromagnets. Some borrow their architecture from traditional spur or planetary gears, while others leverage the characteristics of magnetic fields and magnetic circuits, either axially or in concentric orientations. As shown in Table 1, these inventions span more than one hundred years and illustrate a variety of ways that magnets can be used to convert rotation speeds and torques without contact between gears.

TABLE 1

Magnetic Gears Described in US patent Literature

| patent # | Year | Ref. | Device Description |
|---|---|---|---|
| 0,687,292 | 1901 | 4 | Spur Gear - permanent and electromagnetic elements |
| 1,171,351 | 1916 | 5 | Concentric - inner iron rotor with magnetic stator layer |
| 2,243,555 | 1941 | 6 | Spur Gear - interdigitated elements, parallel and perpendicular shafts |
| 3,301,091 | 1967 | 7 | Concentric - 2-pole inner magnet rotor drives iron comb stator |
| 3,382,386 | 1968 | 8 | Axial Field - multi-plate without iron modulation |
| 3,645,650 | 1972 | 9 | Concentric - inner magnet rotor with specially shaped iron stators |
| 5,013,949 | 1991 | 10 | Planetary - sun, planets and ring each have multiple poles |
| 5,633,555 | 1997 | 11 | Concentric - inner 2-pole rotor with continuous iron stator |

Furlani, 2000 [13] and Jorgensen, 2005 [14] present analytical solutions for the torque transmission between parallel shaft multi-pole cylinders that are the magnetic equivalent of mechanical spur gears. These and other magnetic gear variants [15, 16] have torque densities significantly below commercially available mechanical gearboxes [especially, 17, 18], as shown in Table 2. Only the volume containing the gears and their interactions were used for the calculation of the torque densities in this table. For the commercially available standard gears, the dimensions of the gearbox housings were used to calculate the volume. Input and output shafts and other external materials were left out to facilitate the comparison of commercially available standard gearboxes with experimental magnetic gears. Thus, the differences in torque densities between magnetic gears and traditional gears are understated in this table Improved torque density is obtained when the coupling of permanent magnet material is maximized. One prevalent approach is the use of coaxial engagement of inner and outer rotors, such as those described in 13, 20, 21, 23 and 26.

TABLE 2

Performance Comparison: Traditional versus Existing Magnetic Gear Types

| Gear/Transmission Description | Ref. | Year | Torque Density (kN-m/m^3) |
|---|---|---|---|
| Std. Gears: General Electric DP 2.7 Wind Turbine Gearbox | 17 | — | ~700 |
| Std. Gears: Neugart PLE-160 Planetary Gearbox | 18 | — | 600 |
| Std Gears: Boston Gear 221S-4 1-Stage Helical Gearbox | 19 | — | ~10 |
| Non-contact Spur Gear, Parallel Shafts | 14 | 2005 | 1.48 |
| 6-pole, coaxial couple | 15 | 2009 | 1.52 |
| Skew Gears, Orthogonal Shafts | 16 | 2002 | 3.18 |
| Simple Axial Field, Parallel Shaft | 21 | 2001 | 9.55 |
| Shutter-type, coaxial magnetic gear | 22 | 2009 | 58.5 |
| Axial field, plate-to-plate, shutter-type gear | 23 | 2006 | 70 (reported) |
| Epicyclic (planetary), non-contact, magnetic | 24 | 2008 | ~90 |
| Magnetic Cycloid Gear | 25 | 2008 | 106 (183, optimized) |
| Shutter-type, coaxial magnetic gear | 26 | 2004 | 117 |
| Shutter-type, coaxial magnetic gear with Halbach arrays | 27 | 2010 | 123 |

There are two main contributors to shear force between magnets that have been demonstrated during this project. The first is that the spatial frequency of repeating patterns is an important factor in the shear force produced, and especially in terms of the shear force per volume of magnetic material. The other important factor is related to the pattern of magnetization within the substrate, including the creation of a one-sided field emission structure that maximizes the interaction between the two plates. The triangle and continuously varying patterns, outlined below, illustrate the role of magnetization in generating shear forces between magnets.

Furlani [2], introduces a very useful magnetic charge model which applies to the present discussion. The field of a permanent magnet can be expressed as an integral function of its magnetization, as shown in Equation 2. While the details of this equation are beyond the scope of the present discussion, it is the launching point for the analytical work that has become a part of this project and will form the first section of the shear force journal article that is being prepared based on the work outlined in this report.

Equation 3 defines a continuously rotating magnetization vector of a spatial frequency 'f' in a rectangular magnet having a length '2a'. This magnetization pattern was modeled and the results are described below.

$$\vec{B}_1(\vec{x}) = \frac{\mu_0}{4\pi} \int_V \frac{(-\nabla \cdot \vec{M}(\vec{x}_1))(\vec{x} - \vec{x}_1)}{|\vec{x} - \vec{x}_1|^3} dV_1 + \frac{\mu_0}{4\pi} \oint \frac{(\vec{M}(\vec{x}_1) \cdot \vec{n})(\vec{x} - \vec{x}_1)}{|\vec{x} - \vec{x}_1|^3} dS_1 \quad (2)$$

$$\vec{M}(\vec{x}_1) = -\sin\left(\frac{f\pi}{a}x\right)\vec{i} + \cos\left(\frac{f\pi}{a}x\right)\vec{j} \quad (3)$$

Furlani's charge model can also be applied to the forces between two permanent magnets by integrating the field from the first magnet multiplied by the magnetization of the second, as shown in Equation 4. What is interesting is that the shear comes from the interaction of the gradient of B-field from magnet 1 (here "$B_1$"), with the magnetization of the second magnet, M. By looking at only the force in the 'x' direction (the shear force in this case) the expression can be simplified to Equation 5. This provides a clearer picture of the source of shear force at each point in the second magnet: it is the gradient of the 'x' direction B field (from magnet 1) multiplied by the magnetization vector within magnet 2. Since the magnetization is limited to a maximum saturation point for the material, creating large gradients throughout the volume of a permanent magnet requires some kind of oscillation. Alternating fields, of course, create local magnetic circuits and tend to increase field gradients, but reduce the distances that fields propagate away from magnet surfaces. This is an effect illustrated by the field intensity surrounding a substrate with a continuously varying magnetization (similar to that described in Equation 3, above). The region above the substrate, according to Equation 5, is the one capable of producing shear forces in an upper magnet. It is interesting to note the thickness of the green region compared to the thickness of the substrate.

$$F = -\int_V (\nabla \cdot M(\vec{x}_2))B_1(\vec{x})dV_2 + \oint_s (M(\vec{x}_2)\vec{n})B_1(\vec{x})dS_2 \quad (4)$$

$$F_{shear} = \int_V \left(M_x(\vec{x}_2)\frac{d}{dx} + M_y(\vec{x}_2)\frac{d}{dy} + M_z(\vec{x}_2)\frac{d}{dz}\right)\vec{B}_{1x}(\vec{x}_2)dV_2 \quad (5)$$

Figure 9:
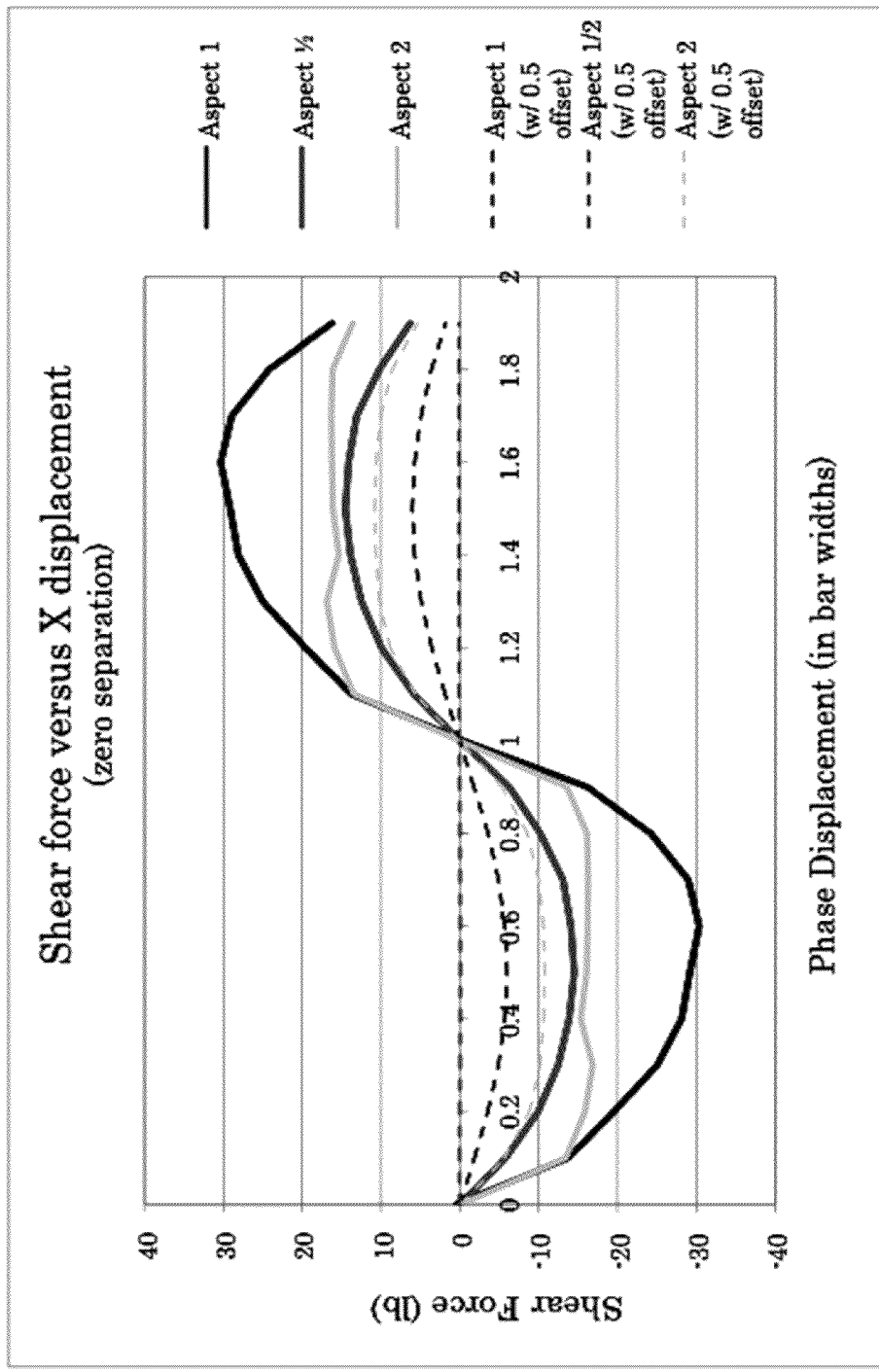
FIG. 9 depicts an exemplary aspect ratio effect on shear force.

FIG. 9 illustrates the first modeling study performed using CMR's simulation software. Surprisingly, the highest shear force comes from a 1:1 ratio of feature size (the width of each block) to substrate thickness. The other interesting effect, which is expected, is that the falloff in force is lower for the thickest magnets. In other words, the ratio of force between zero and ½w (half a block width) offset between magnets is much smaller for higher aspect ratios. This is an effect examined in more detail below.

Figure 10:
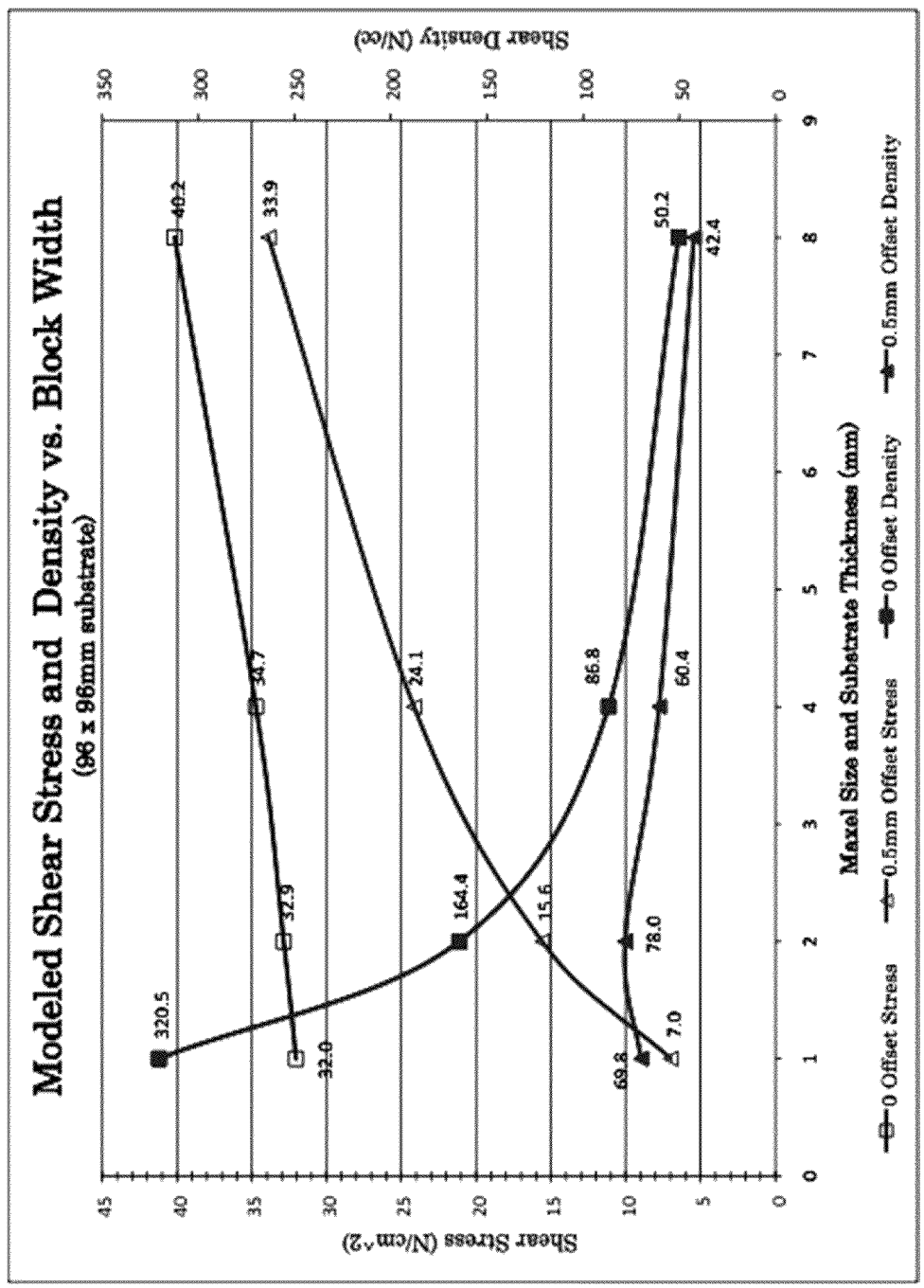
FIG. 10 depicts exemplary shear and shear density for alternating blocks.

FIG. 10 illustrates the scaling effects discovered during the 'alternating block' simulation study. Several square substrates were assembled in the simulation software, each 96 mm on a side. Five different experiments were run with feature sizes of 8, 4, 2, 1 and 0.5 mm. In each experiment, the substrate thickness was matched to the feature size, giving a 1:1 aspect ratio. The highest forces were at a zero offset—achievable only in simulation. At a 0.5 mm offset the curves look very different. The shear stress falls as the block widths are decreased, since the 0.5 mm offset is a more significant offset for smaller blocks. The shear density of the 0.5 mm offset curve peaks at a 1 mm block width and then falls to almost half that value for an 8 mm block width. This illustrates that the best shear force per volume of magnetic material can be created with a 1 mm block, if the offset is 0.5 mm. On the other hand, a larger block width (and substrate thickness) of 8 mm or more would be used if the goal were to have a maximum shear force per unit area.

Figure 11:
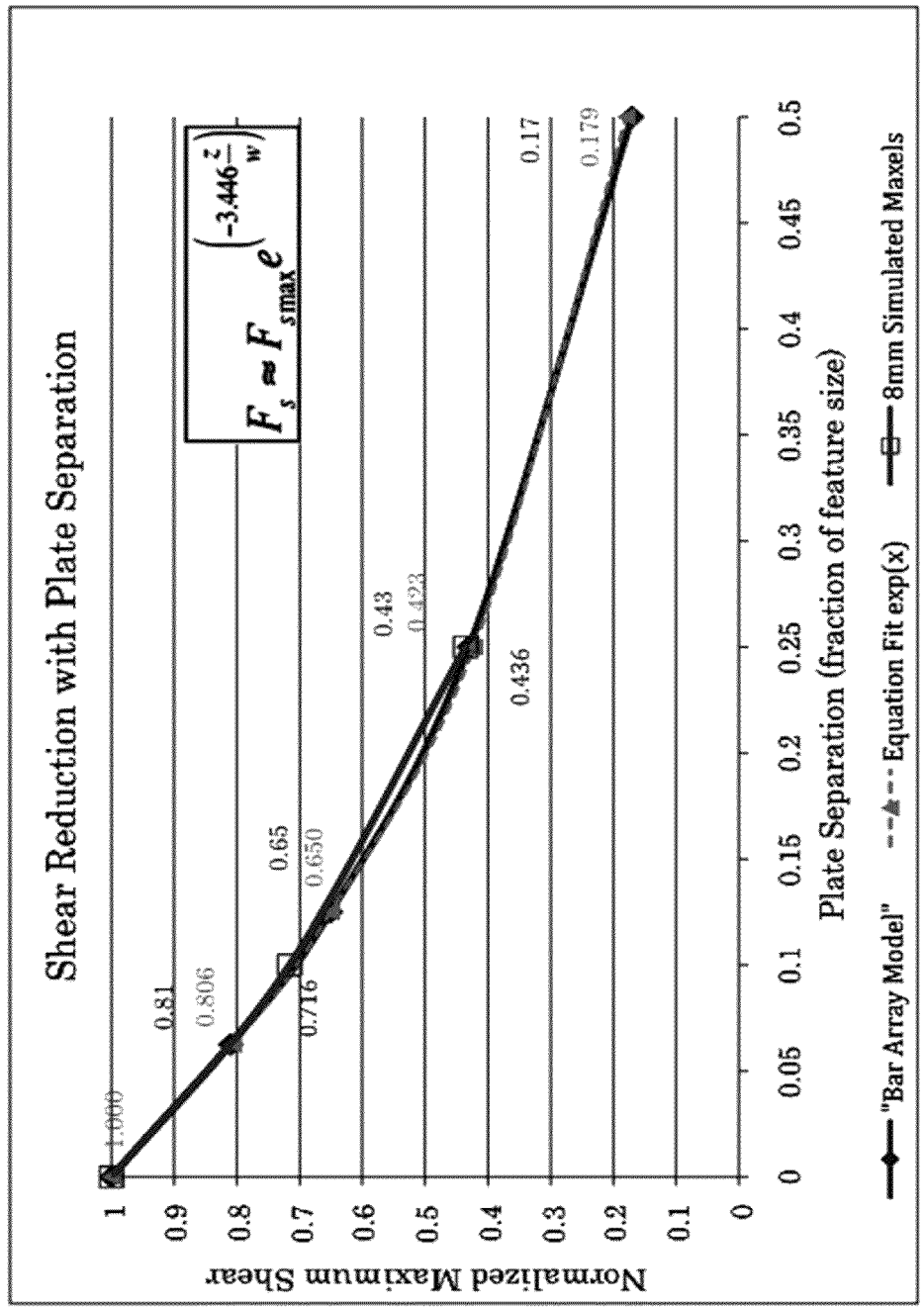
FIG. 11 depicts exemplary alternating blocks and simulated maxel shear force reduction with plate separation.

Another important discovery of the 'alternating block' study was the relationship between feature size and the decrease in force with distance. The same relationship was also found to apply to simulated maxels, as shown in FIG. 11. Instead of following an inverse square or inverse cubic relationship, the model data more closely follows an exponential curve. Additional research would be necessary to understand mathematics behind this.

Figure 12:
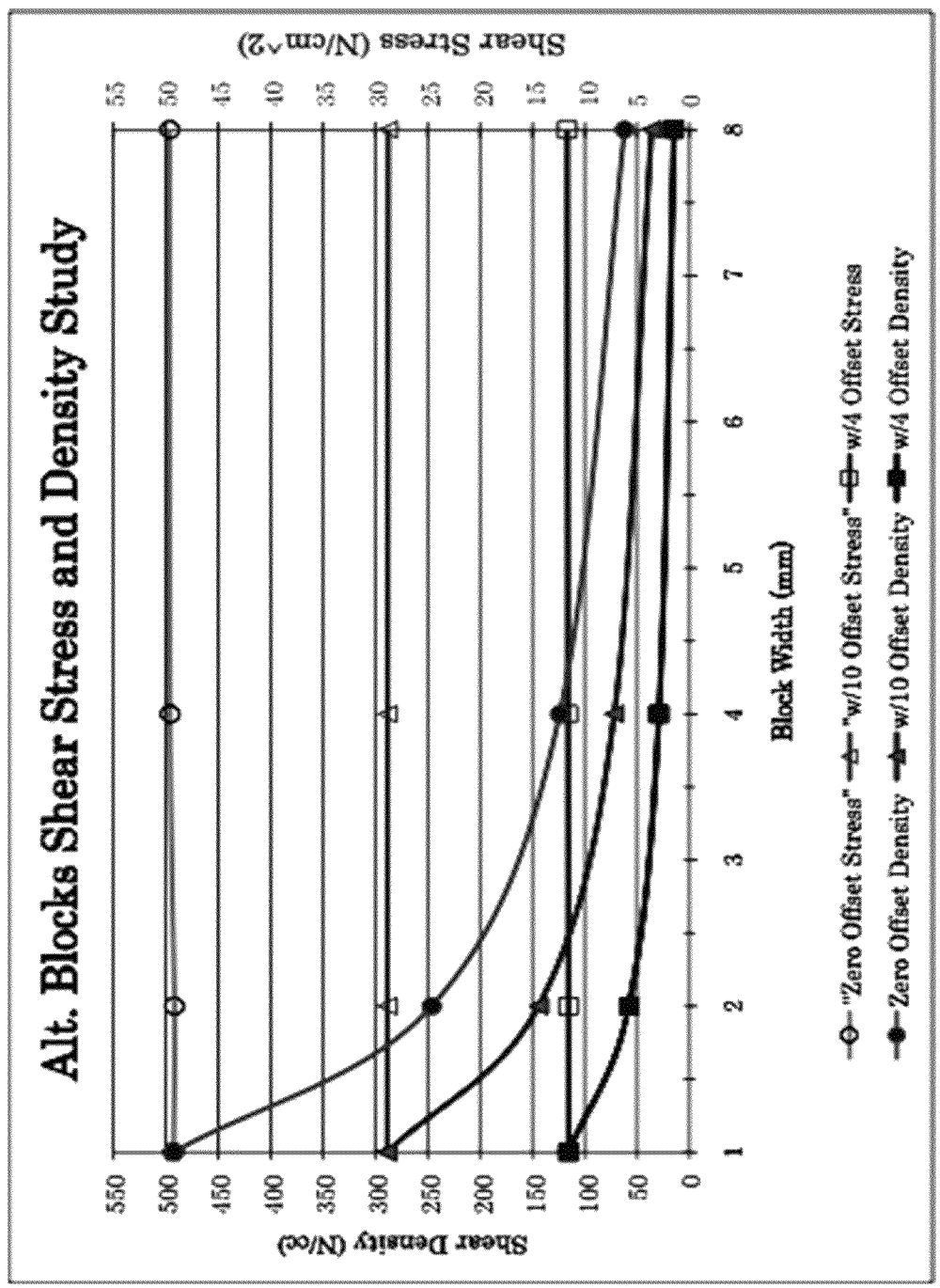
FIG. 12 depicts exemplary alternating block shear stress and density from Maxwell.

The CMR technologies grew from applying signal processing and coding theories to magnetic fields. One way of looking at the graph in FIG. 12 is to see the feature size 'w' as the inverse of spatial frequency and shear force attenuating with the distance between the plates 't'. High spatial frequencies relate to more rapid force attenuation. Taking this analogy further, the 'alternating block' pattern represents a square wave, which is equivalent to a Fourier Series (which for a square wave is sinusoidal curves having odd multiples of the base spatial frequency). If this is the case, the base spatial frequency is the dominant contributor to shear force at a particular offset. Based on this perspective, it was expected that the maximum shear force will come from some type of repeating, sinusoid-like magnetization pattern which would fall off more slowly with increasing offset. As is shown by the modeling effort in Maxwell, this is only partly true.

The 2D alternating block model built in the Maxwell simulation software shows several important differences with the results from the internally developed CMR software (with reference to FIG. 12). The shear stresses are higher. Even with the offsets pegged to the feature sizes, the shear stresses remain surprisingly constant as the widths (which are set to be equal to the substrate thicknesses) get smaller. The shear densities predictably double as the thicknesses are cut in half.

The maximum shear stress (48N/cm^2) of the triangle pattern as calculated by the CMR software is not significantly different from the alternating blocks or simulated maxel studies described above, and may stem from differences in the models themselves. The shear densities did change, but in an expected way. For alternating blocks, a 1 mm feature size led to a shear density of 160N/cc. The shear density calculated for 1 mm simulated maxels was 240N/cc. For the triangle study, a 1 mm feature size was calculated to have a shear density of 467N/cc. Since the substrates are scaled to ½ the feature size, the shear densities were nearly double that of the simulated maxel study.

However, the results of the triangle study in the CMR simulation software were ultimately not used to guide the development of maxel patterns. The 2 mm and 4 mm width triangle models did not follow curves with the same shape. There were also had challenges in terms of model convergence and handling the large gradients in the corners of the triangles. It was difficult to know to what extent the model was matching the behavior of a physical system in this case. Fortunately, a model built using the Maxwell software provided additional insight into this magnetization pattern.

Figure 13:
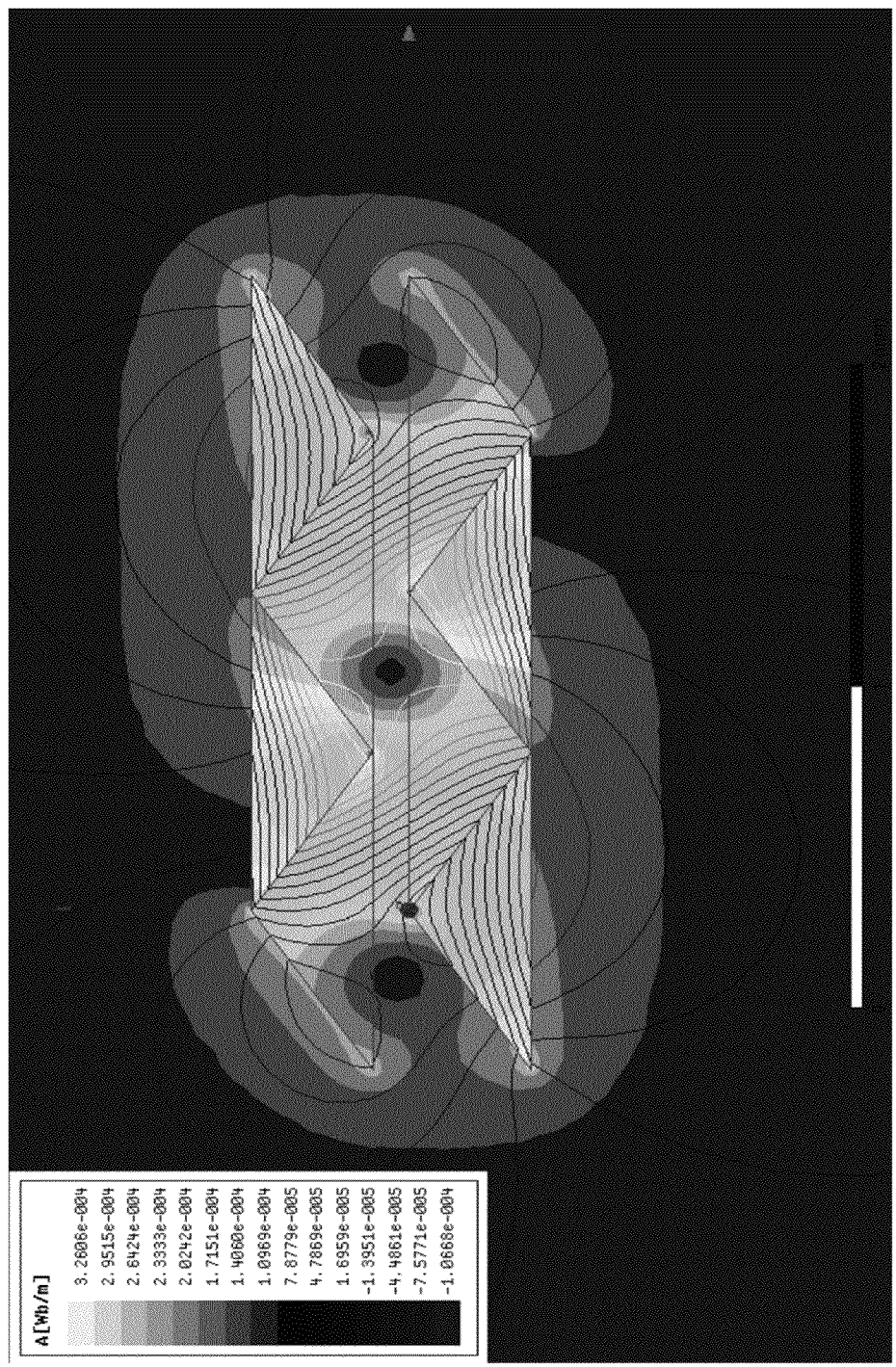
FIG. 13 depicts exemplary field intensity and lines at maximum shear for the triangle pattern.

A section of the Maxwell triangle pattern model oriented at a maximum shear condition is illustrated in FIG. 13. The leaning field lines indicate a shear force between the structures. Even from this short section it is clear that this is largely a one-sided structure. The ratio of the triangle widths to the thickness of the substrate in this image is 2:1.

Figure 14:
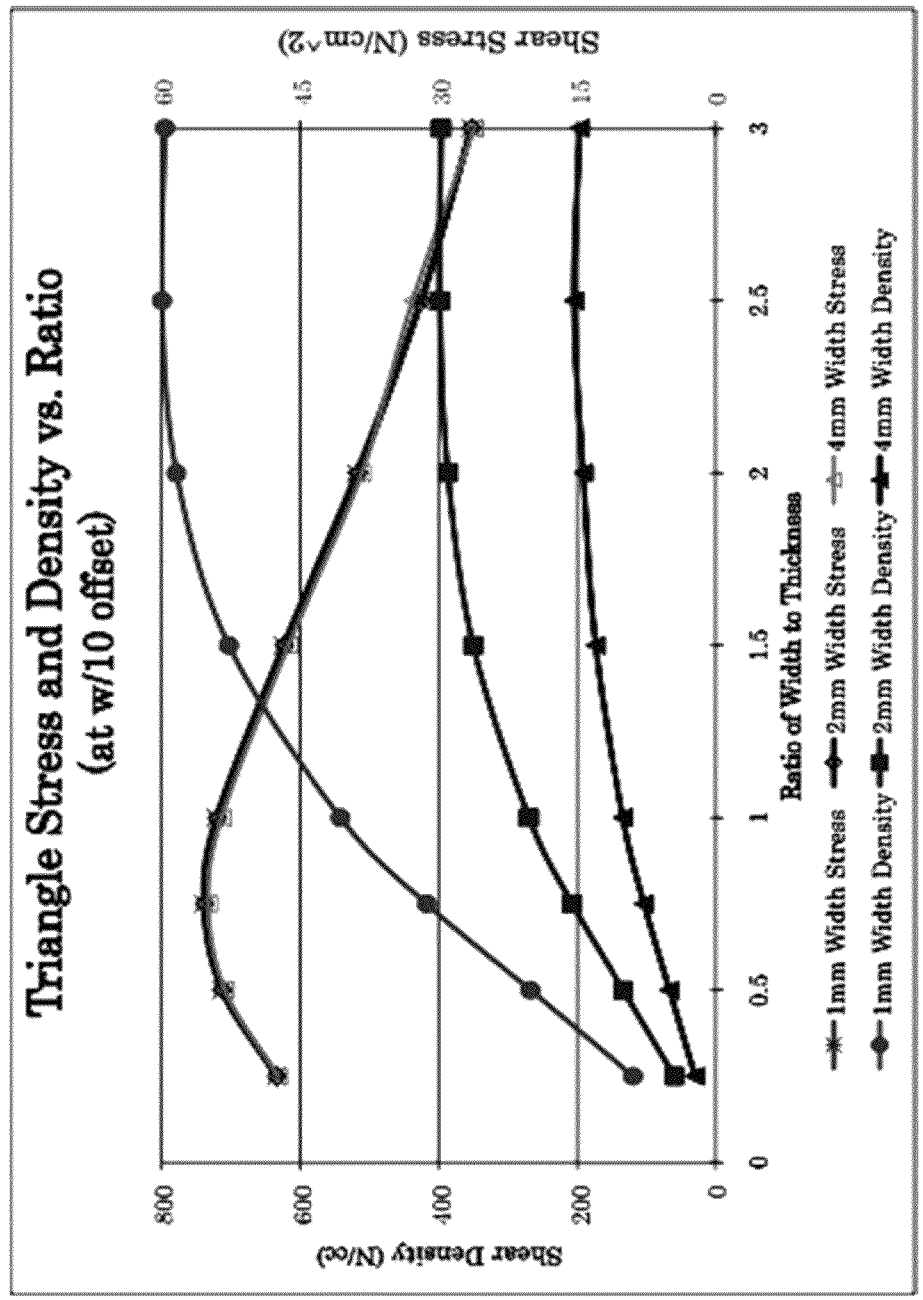
FIG. 14 depicts exemplary shear stress and density versus ratio of triangle with to thickness.

The shear stresses and shear densities for the triangle pattern are shown in FIG. 14 plotted against the ratio of triangle width to substrate thickness. The best ratio for shear stress is about 0.75, while larger ratios (indicating flatter triangles and thinner substrates) correspond to higher shear densities. This is similar to the behavior of the alternating block model that was built using the internally developed CMR simulation software (illustrated in FIG. 10, above). For a given offset, maximum shear forces come from thick magnets, while the most efficient use of magnetic material (force per volume) comes from an alternating pattern with a spatial wavelength of about 4 times the offset. For other magnetization patterns this ratio may be somewhat different, but the same basic pattern should apply. This relationship between offset and spatial wavelength has significant impact in the design of magnetic gears and couples. For a given application of magnetic shear force, the gap that can be held between magnets determines a fundamental limit on the shear density for the magnets and also sets the range of spatial wavelengths for the magnetization pattern in those magnets. That said, there are additional geometric considerations that must be taken into account to translate the results of these flat-plate models into design guidelines for magnetic couples or gears. More discussion about this topic may be found below.

It is also interesting to compare the shear stresses for the alternating block model with those from the triangle model. At an offset of w/10 the shear stress from the alternating block model was $28N/cm^2$ for the same offset the triangle pattern was calculated to produce $55N/cm^2$. The differences in shear densities are more pronounced: 280N/cc for alternating blocks and 800N/cc for the triangle pattern.

Building a physical substrate from a series of triangular bars may not be practical. But, the behavior of this pattern shows how a one-sided field structure can improve shear forces between magnets.

Figure 15:
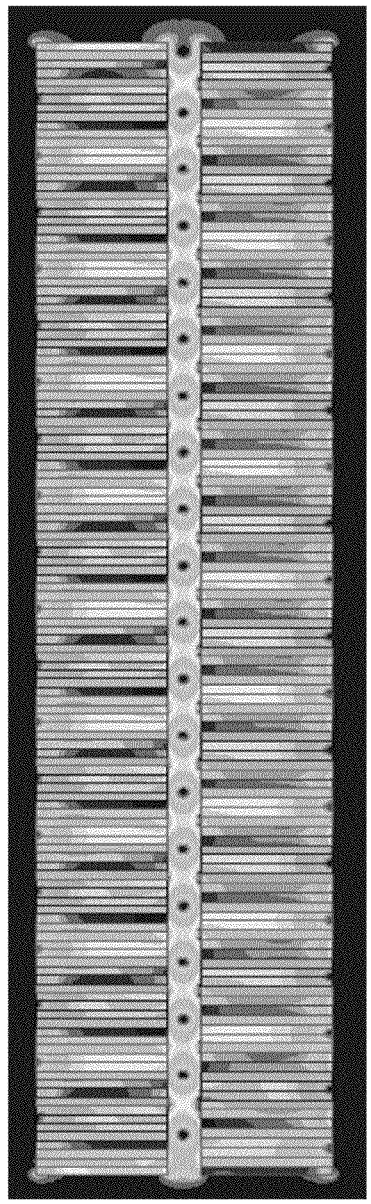
FIG. 15 depicts field intensity for continuously varying pattern.
Figure 16:
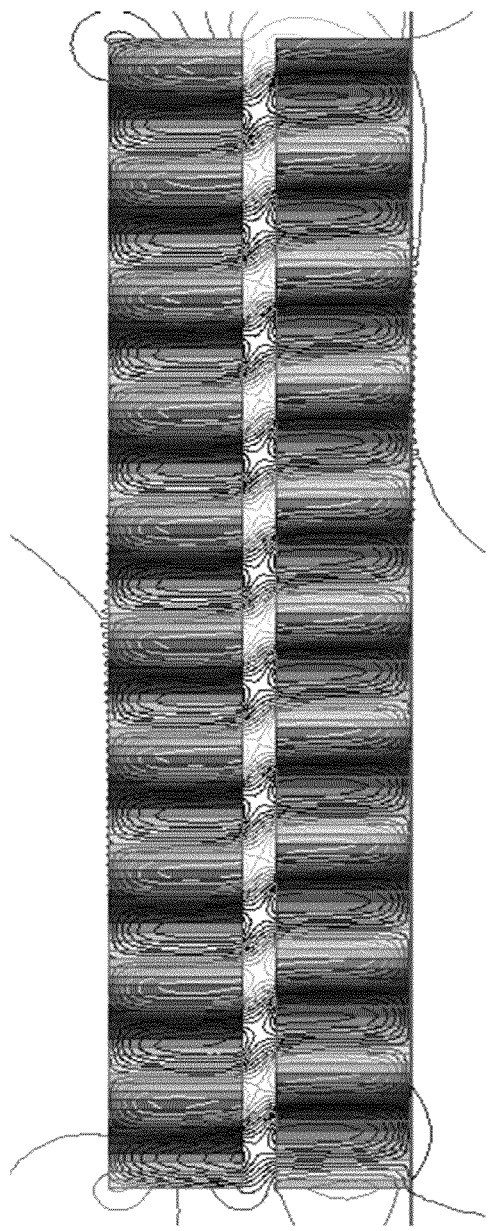
FIG. 16 depicts field lines for continuously varying pattern.

The field intensity and field lines surrounding the continuously varying (CV) pattern are illustrated in FIGS. 15 and 16, respectively. These figures illustrate how the field from these magnetic structures is emitted almost entirely toward the opposing magnet. The rightward skew of the field lines in FIG. 16 indicate a shear force on the top magnet structure. The layered structure of the models is also visible in these images, although the shear force data was obtained using 12 or more slices per spatial wavelength, while only 5-6 slices per wavelength are illustrated in the figures.

The discussion above included speculation that a single spatial frequency (rather than the family of harmonics that assemble the square-wave of the alternating block pattern) would fall off less rapidly with offset. This is not the case according to the results of the Maxwell modeling effort. The continuously varying pattern falls off slightly faster with increasing offset. At an offset of w/10, the alternating block pattern retains 58% of its zero-offset shear force, while the CV pattern retains 53% according to the Maxwell models.

Figure 17:
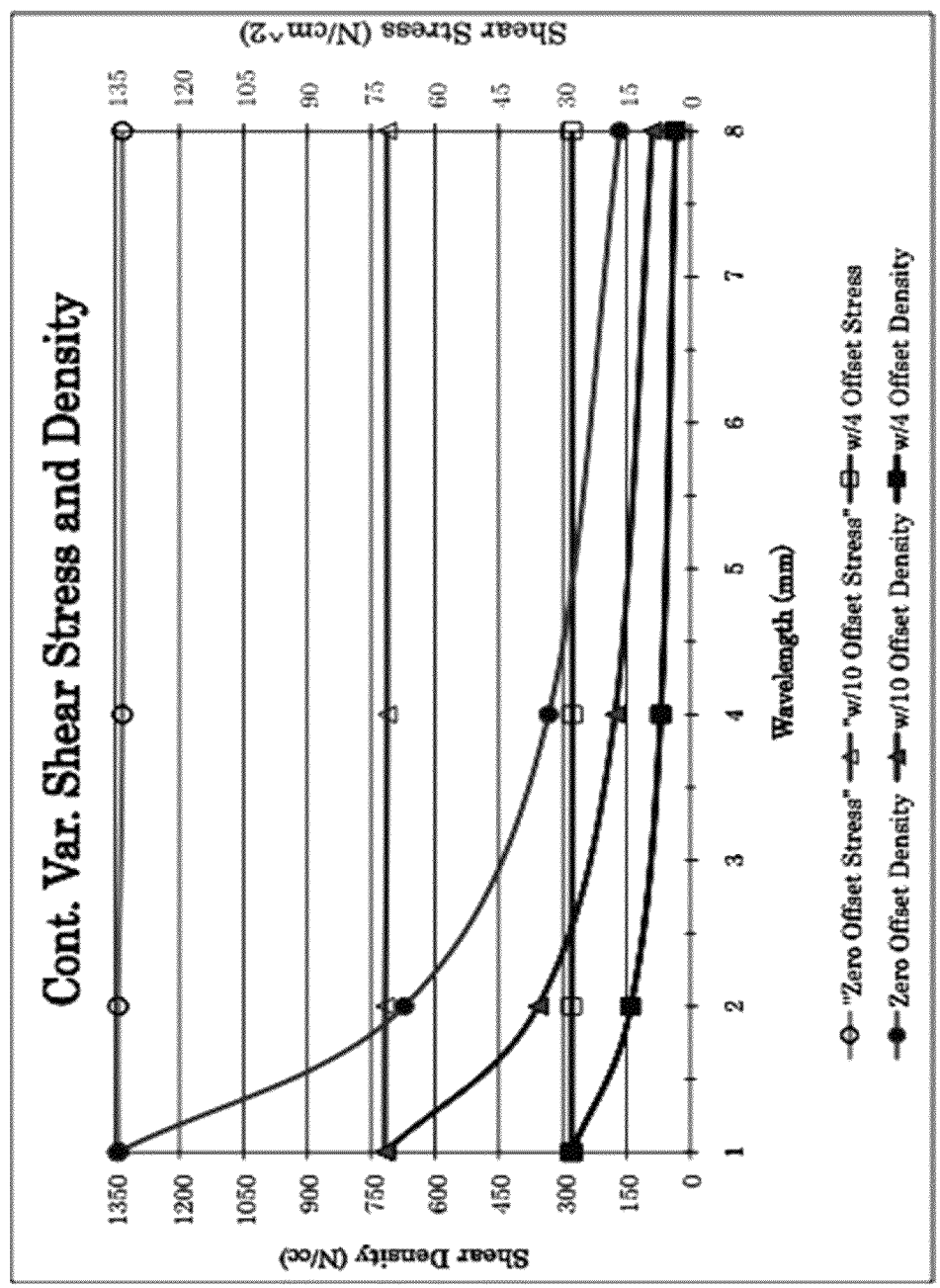
FIG. 17 depicts exemplary shear stress and density for the continuously varying pattern.

The shear stress and shear density graph for the CV pattern (see FIG. 17) looks very much like the one from the alternating block model above, except the numbers are much higher. Instead of $28N/cm^2$ for the alternating blocks, or $55N/cm^2$ for the triangle pattern, the CV pattern generates $71N/cm^2$ according to the model. For a w/10 offset, the triangle pattern is capable of matching the shear density of the CV pattern for high ratios of width to substrate thickness.

Figure 18:
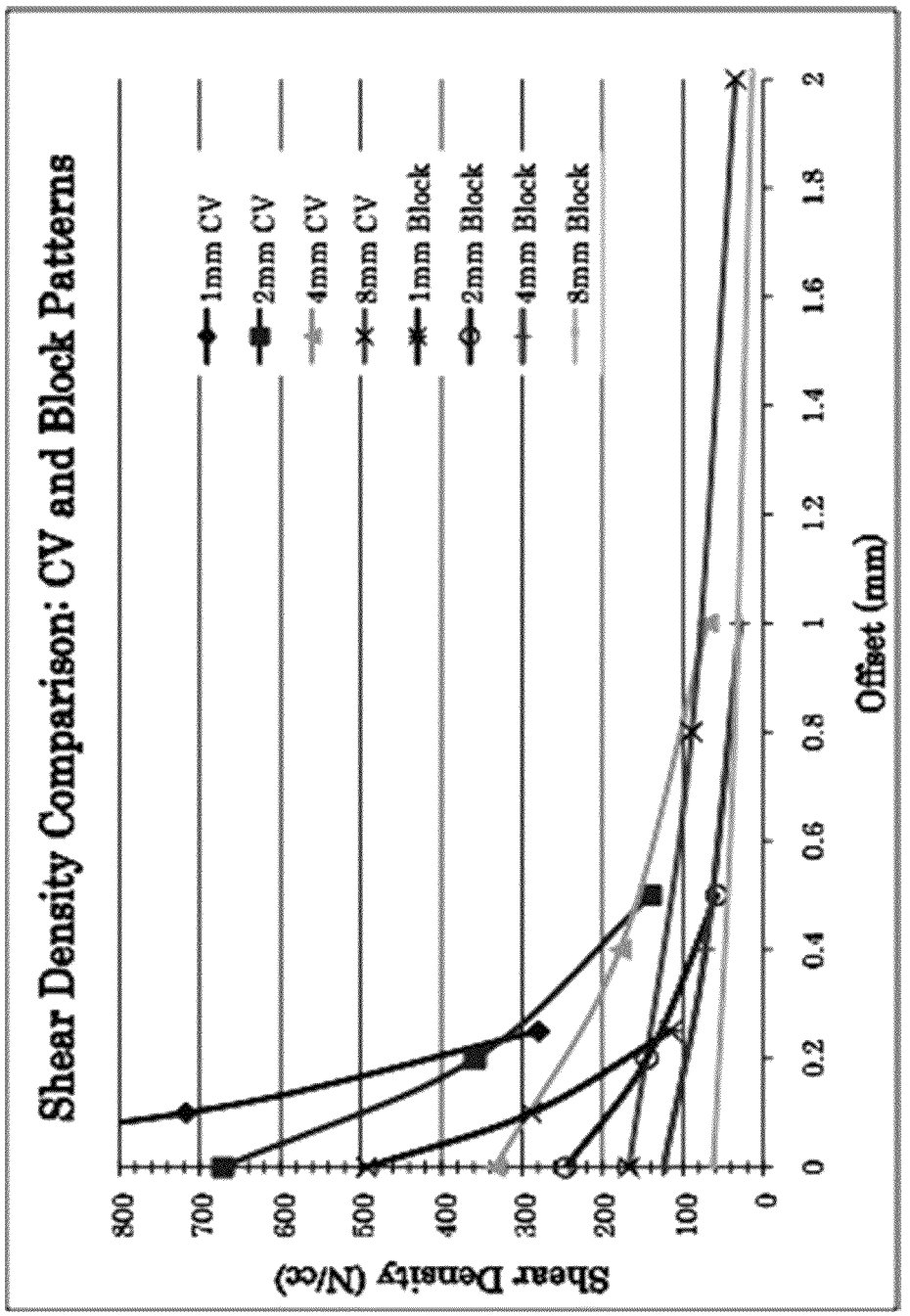
FIG. 18 depicts an exemplary shear density comparison of continuously varying and alternating block patterns.

The effect on shear density of moving from the alternating block magnetization pattern to the CV pattern, which introduces both a one-sided field and a smoothly varying magnetization, is illustrated in FIG. 18. Referring back to Equation 5, it is possible to identify a potential source of the additional shear force in this CV pattern. The only source of shear force in the alternating block would be the third term in the brackets (see Equation 6) since the magnetization in that pattern is only oriented in the 'z' direction. For the CV pattern, the magnetization rotates through both the 'z' and 'x' directions, which allows field gradients in the 'x' direction to also be a source of shear force.

$$\left( M_z(\vec{x}_2) \frac{\partial (\vec{B}_{1x}(\vec{x}))}{\partial z} \right) \quad 6)$$

There is additional work necessary to understand how the CV pattern changes the way that the field from the lower plate interacts with the magnetization of the upper plate at a more fundamental and complete level. This work would guide the synthesis of a repeating magnetization pattern that would maximize this interaction. In turn, this work would guide the development of maxel patterns to produce even higher shear force magnets and higher torque density couples and gears than the prototypes developed during the course of this project.

Figure 19:
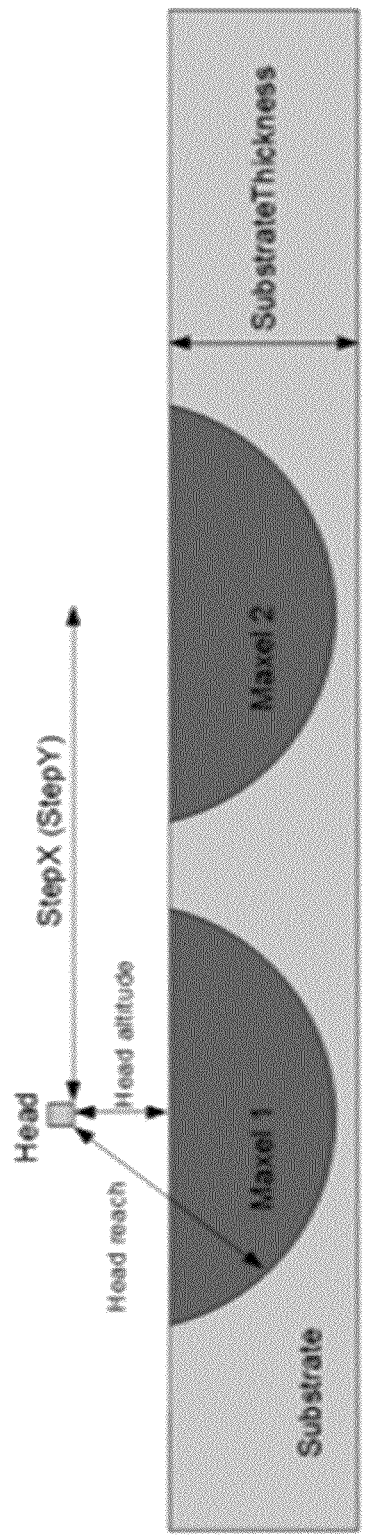
FIG. 19 depicts an exemplary diagram of simulated maxel variables.

A simulation of spot magnetization was built using a dipole model and a simplified magnetization model of the substrate. The setup of that model is illustrated in FIG. 19. In this way, patterns of numerical maxels were created that represented the CMR magnetization process, which were used to calculate the forces between two maxel patterns. In this study, the feature size was the distance between two adjacent maxels, the "X-step". The head was approximated by a dipole set at some altitude above the substrate.

Figure 20:
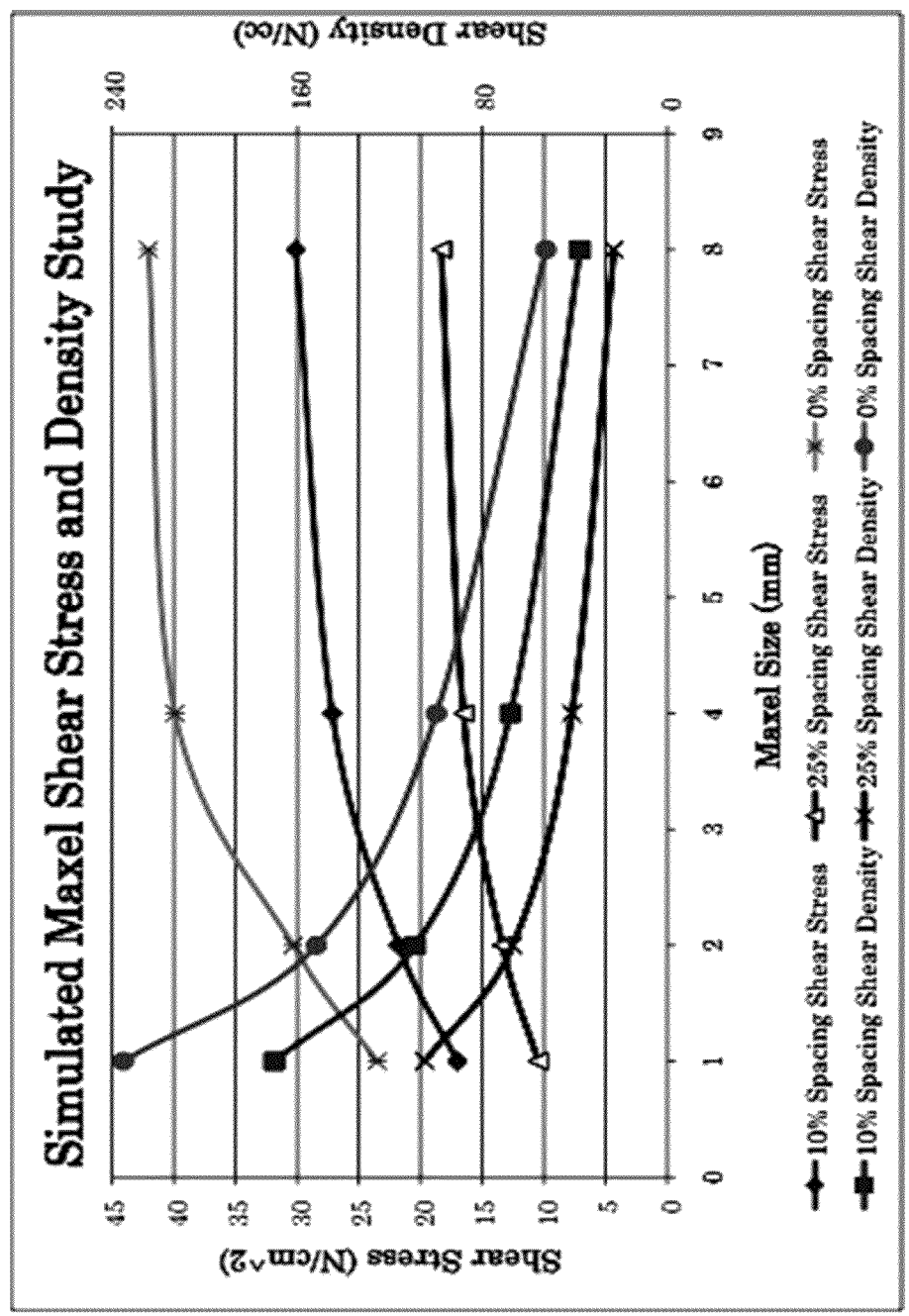
FIG. 20 depicts exemplary shear stress and shear density for simulated maxels.

As illustrated in FIG. 20, the shear stress and shear density curves were similar to the ones generated during the alternating block study. Similar to the scaling of alternating blocks and the CV pattern, smaller maxels increase shear density while larger maxels increase shear stress. The maximum shear stress was $42N/cm^2$—which is surprising. It is not significantly higher than the alternating block study performed using CMR software. The shear density (N/cc) is 50% higher, which indicates some magnetic circuit characteristics in the substrate that resemble one-sided field structures.

It is difficult, however to determine what additional guidance this model establishes for the design of high-shear maxel arrays. The 'z' direction field profile above a single maxel in this simulation did not match the near-gaussian profile tested above printed maxels. The field profile around the proprietary magnetization head developed by CMR is different from a single dipole. Further, CMR is pushing the limits of high-speed magnetization into areas of magnetization dynamics that are not yet well understood. As one example of the complexity of this process, NIB material has been observed to have a variable ferromagnetism that is dependent on the magnetization condition. From observations, including several from the experimental work during this project, there are significant interactions between magnetized regions and maxel printing. This means that overlap between maxels and the order the maxels are magnetized influence the fields emitted from, and the forces between, maxel arrays. The results of this model follow the basic behavior of other models developed during this project, but ultimately the simulation results come from an over simplification of the magnetization head, the magnetic material, and the magnetization process.

In order to acquire the most accurate characterization data possible, CMR produced a 3D field probe apparatus with a 40μ, 3-axis Hall-effect probe. This device enables a far more comprehensive exploration of the fields emitted from individual maxels, and arrays of maxels created under a variety of conditions. This capability, combined with the development of a more representative magnetization model in Maxwell, will support improvements to the CMR magnetization process, to include speed, maxel profiles, and more accurate assessment, and allow maxel arrays to be designed to make better use of the magnetic material.

Figure 21:
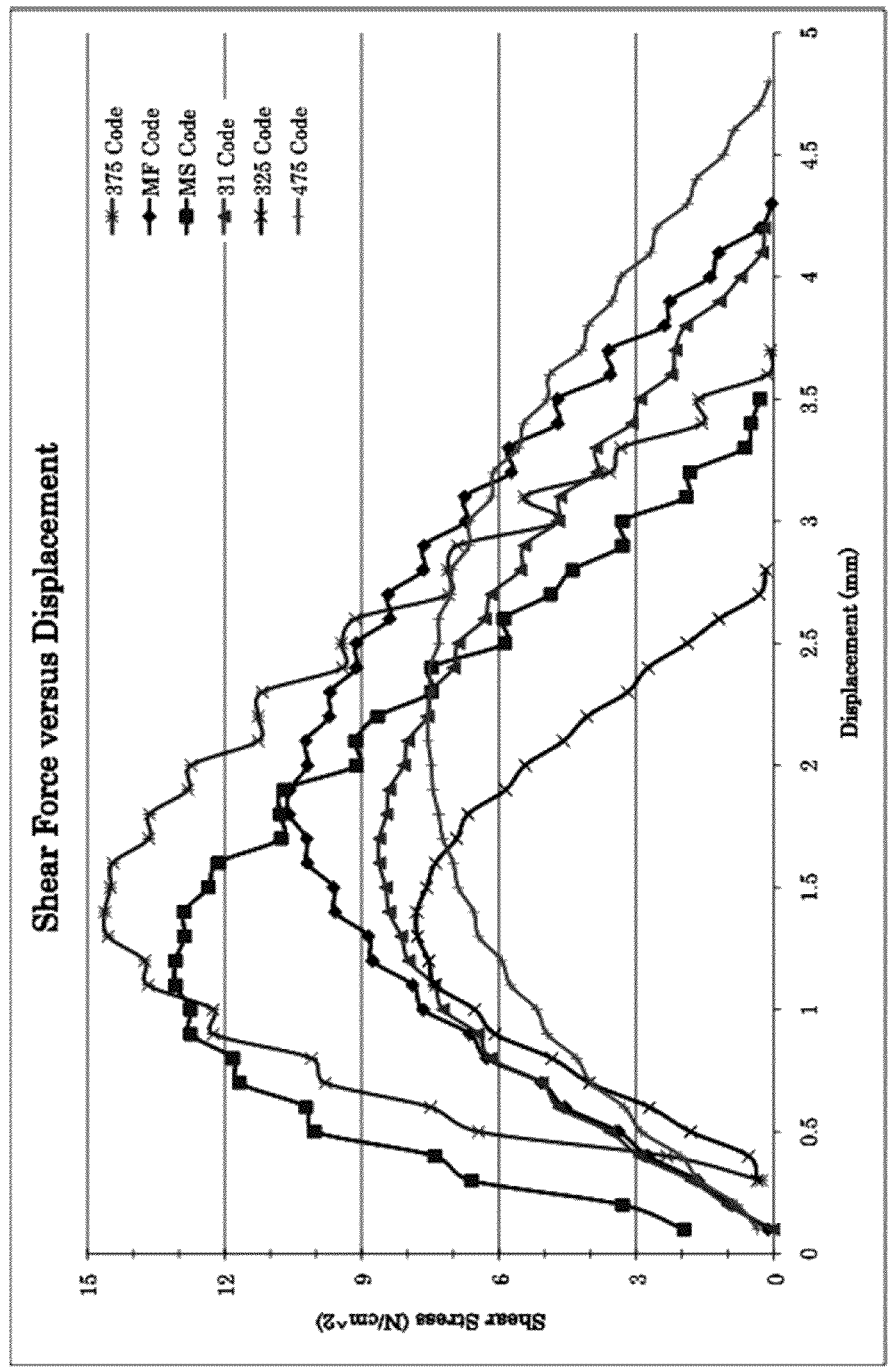
FIG. 21 depicts exemplary shear stress versus displacement for various codes.

A large variety of maxel patterns were designed, printed, and tested during this project. This led to the development of codes that demonstrate substantially higher shear forces and force densities compared to the literature. A single pass of shear force data for a selection of codes is shown in FIG. 21, which illustrates several different shear force behaviors and the performance of the instrumentation system used to obtain the data. As expected, the shear forces reach a maximum at about one-half the displacement between maxels (in the 'x' direction). The notable exception is the 325 Code that was expected to span 3.25 mm. The shear forces for the 325 Code magnets exhibit shear forces that do not reverse completely, and also deviate from a sinusoid. Instead they are stronger in one direction, which skews the observed period. This presents an interesting ratcheting function due to the effects of magnetization order that is possible using arrays of maxels for shear force or torque.

Another interesting deviation from expectations is illustrated by comparing the MS, 31 and MF codes. The expectation was that the 31 Code would exhibit shear forces that sat between the MF and MS codes since the MF varies in both X and Y and the MS only in X. The 31 Code varies more slowly in Y, which should place it in an intermediate position. That the 31 Code falls below these other two codes indicates that there may be two competing effects. The modeling work focused on magnetization variation only in X. The comparison between the MF, MS and 31 Codes shows that the variation of magnetization in two directions is more complex. Variation in both X and Y has the effect of increasing the effective spatial frequency of the substrate, which should reduce the shear force at a particular offset. However, the benefits of reducing the spatial frequency illustrated in several of the graphs of model data above were tied to also increasing the thickness of the substrate. So the effect of decreasing spatial frequency without increasing substrate thickness is to reduce the amount of shear force available, which is an effect illustrated by FIG. 22.

Figure 22:
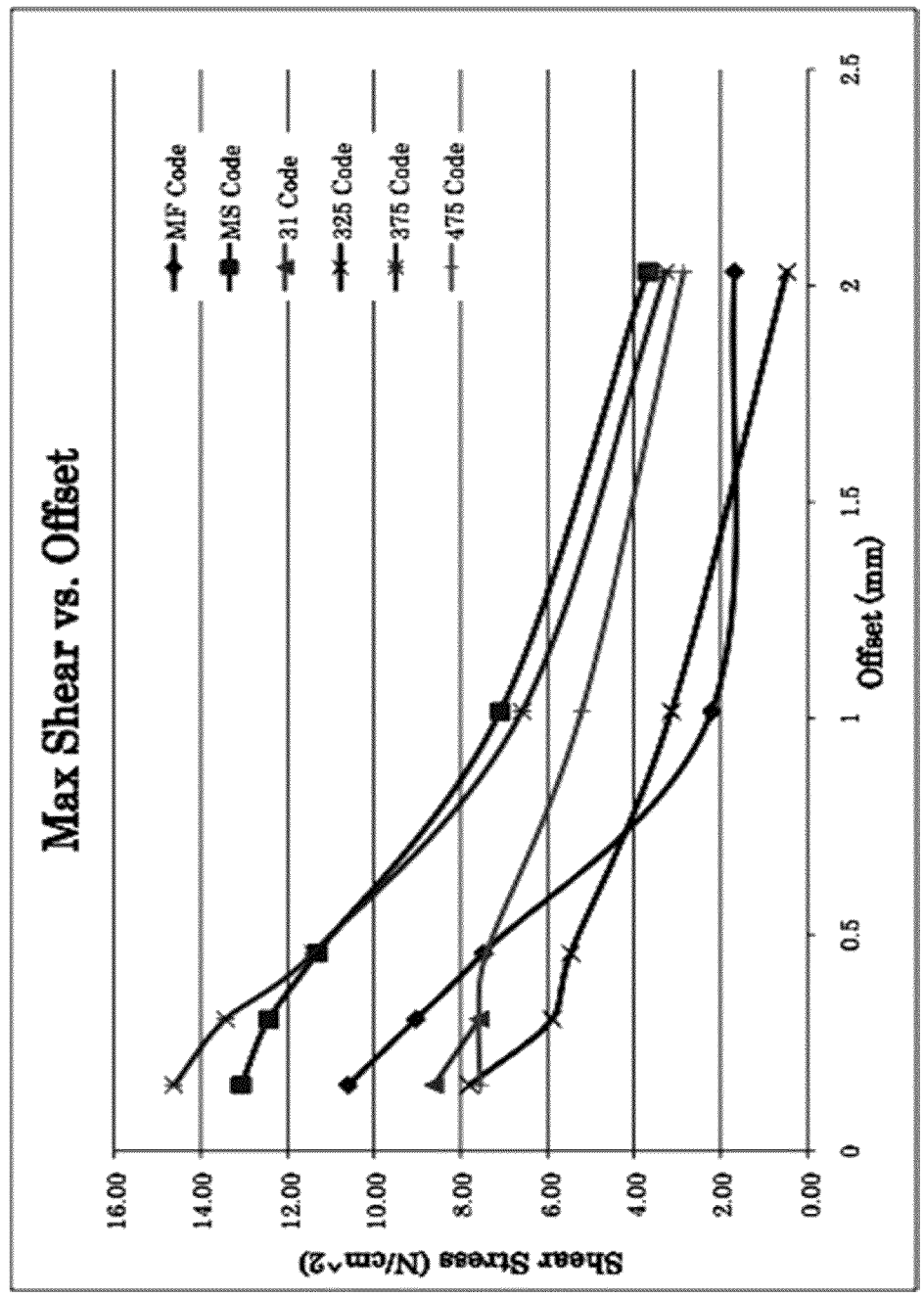
FIG. 22 depicts exemplary shear stress versus plate offset for various codes.
Figure 23:
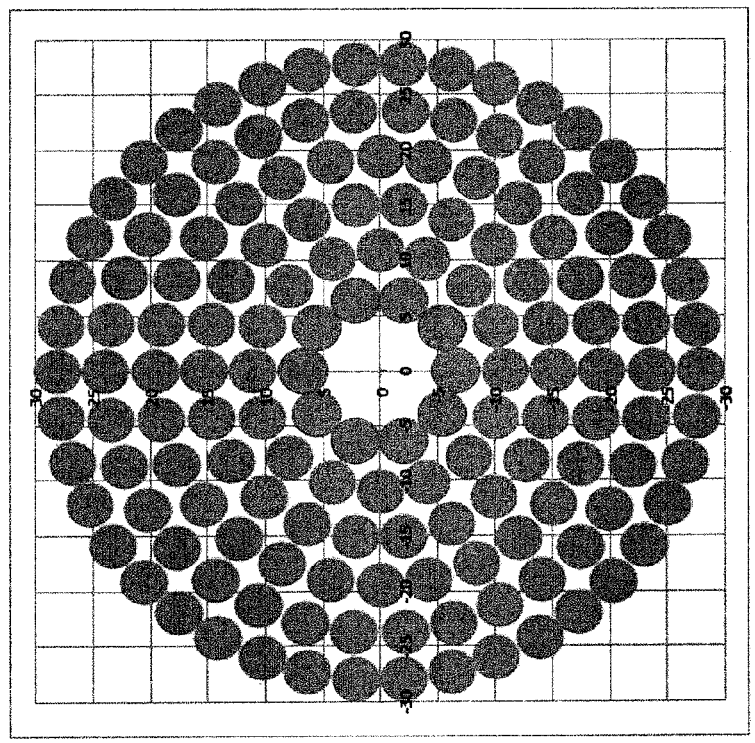
FIG. 23 depicts an exemplary magnetic shear force transfer device comprising two magnetic structures.
Figure 23:
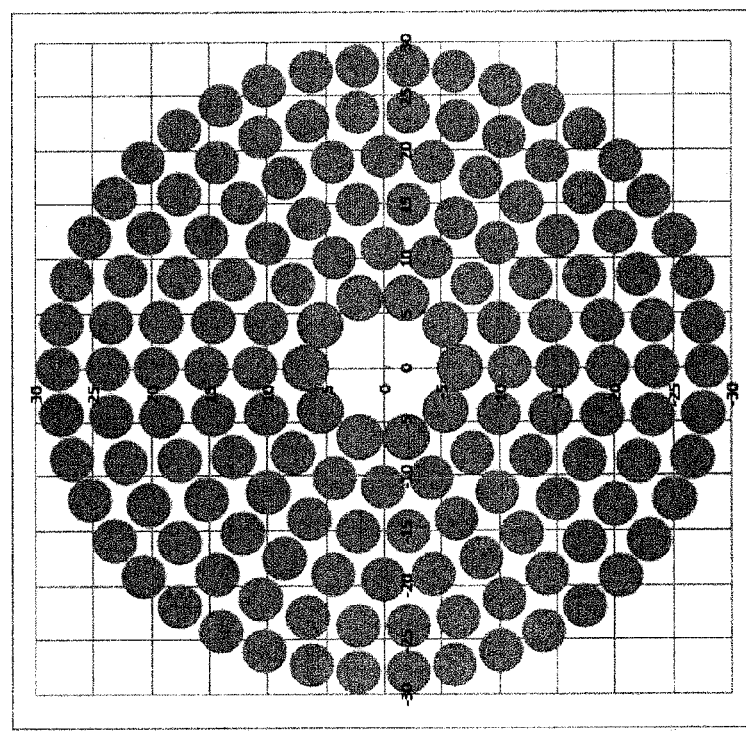

Another important comparison in FIG. 23 is between the 325, 375, MS and 475 Codes. These are all codes that feature stripes of alternating maxels extending across the magnets (in the 'y' direction), though the MS Code has a slightly different architecture. The 325 and 475 Codes remain below about 8N/cm$^2$ while the MS and 375 reach 13 and 14.5N/cm$^2$, respectively. These are good results compared to the shear stresses of existing magnetic gears, which range from about 3 to 5N/cm$^2$. Of course, the critical variable in this comparison is the offset between magnets. All of the magnets tested here were square magnets, 25 mm on a side. A 0.5 mm offset between magnets of this scale represents a relatively wide tolerance. As illustrated in FIG. 22, the 375 and MS Codes retain shear stresses that are about 11.5N/cm$^2$ at an offset of 0.5 mm. It is also interesting to compare the MF and MS codes in this figure. The MF Code has roughly equivalent variation in 'x' and 'y' and the force predictably falls off more rapidly than the MS code.

At these same displacements, the Maxwell models predict far higher shear forces for both the alternating block and CV patterns. Additional work will be necessary to determine the sources of these differences and more importantly, to find available techniques for increasing the forces exhibited by maxel arrays.

Based on the results of the shear force experiments, a series of high torque (HT) codes were developed for printing onto commercially available 3" OD, Nickel-plated, N42, NIB disks, ⅛" thick. Several different strategies were used to design the codes. As an example, the code illustrated in FIG. 23, was designed by finding a series of concentric tracks having an even number of positions that matched the 4.25 mm distance between maxels in the MS code. The distance between the center-line of adjacent tracks was also kept close to this number.

Figure 24:
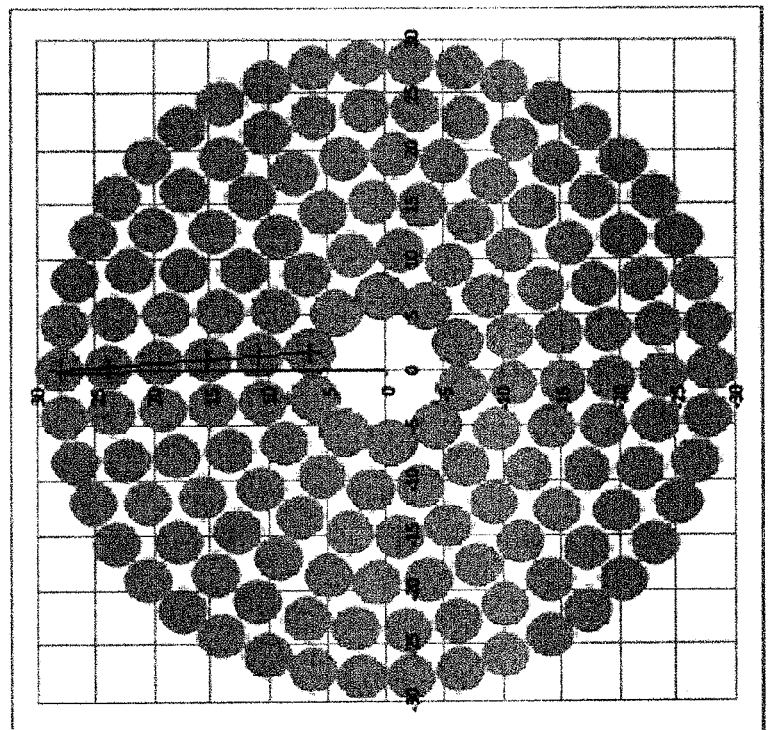
FIG. 24 depicts another exemplary magnetic shear force transfer device comprising two magnetic structures.
Figure 24:
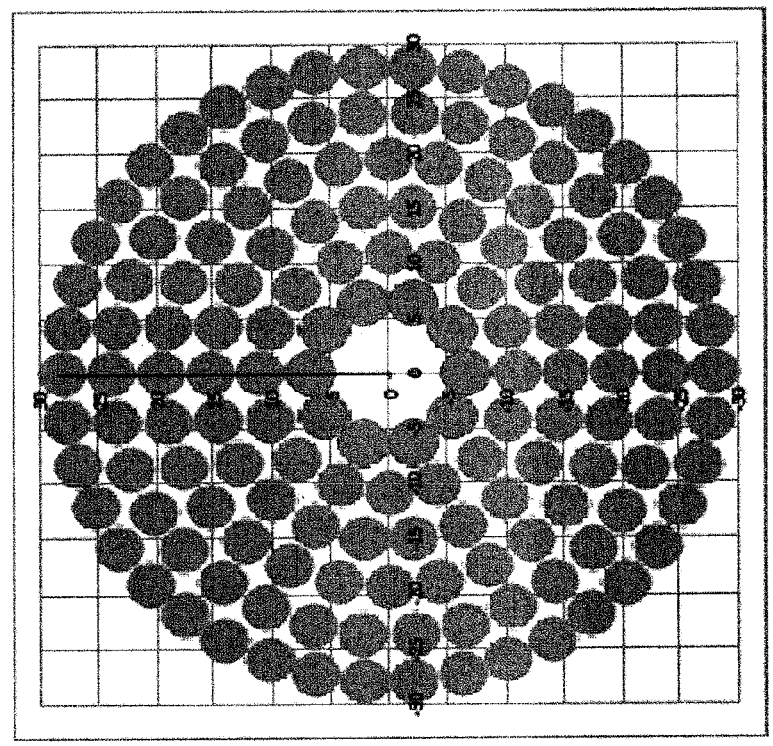

In accordance with another embodiment of the invention depicted in FIG. 24, the innermost tracks of the B magnet of FIG. 23 are rotated so the maximum torque condition of each track coincides to one angular orientation between the two magnets.

The spatial layouts for the six maxel tracks of the codes of FIGS. 23 and 24 are provided in Table 3, where in FIG. 23 Magnet B is the mirror image of Magnet A (i.e., no rotation), and in FIG. 24 Magnet B is similar to the mirror image of Magnet A except there is rotation of the five innermost tracks.

TABLE 3

Maxel Spatial Layout

| Side #1 (Magnet A) | | | | |
|---|---|---|---|---|
| Track # | Radius (mm) | Maxels | dist. (mm) | Start angle (deg) |
| 1 | 6.704 | 10 | 4.143 | 0 |
| 2 | 10.954 | 16 | 4.274 | 0 |
| 3 | 15.204 | 22 | 4.327 | 0 |
| 4 | 19.454 | 28 | 4.356 | 0 |
| 5 | 23.704 | 34 | 4.374 | 0 |
| 6 | 27.954 | 42 | 4.178 | 0 |

| Side #2 (Magnet B) - with rotation | | | | |
|---|---|---|---|---|
| Track # | Radius (mm) | Maxels | d | Start angle (deg) |
| 1 | 6.704 | 10 | 4.143 | 13.714 |
| 2 | 10.954 | 16 | 4.274 | 6.964 |
| 3 | 15.204 | 22 | 4.327 | 3.896 |
| 4 | 19.454 | 28 | 4.356 | 2.143 |
| 5 | 23.704 | 34 | 4.374 | 1.008 |
| 6 | 27.954 | 42 | 4.178 | 0.000 |

The polarity patterns and maxel positions for the maxel tracks of the two-magnet codes of FIGS. 23 and 24 are provided in the following tables.

TABLE 4

Polarity and Position for Track 1

| | Magnet A - all tracks start at 0° | | | | Magnet B - with angular offsets | | | |
| --- | --- | --- | --- | --- | --- | --- | --- | --- |
| Track | Polarity | Maxel # | X (mm) | Y (mm) | Polarity | Maxel # | X (mm) | Y (mm) |
| 1 | n | 1 | 0.000 | 6.704 | n | 2 | 5.114 | 4.335 |
| | n | 3 | 6.376 | 2.072 | n | 4 | 5.703 | −3.524 |
| | n | 5 | 3.940 | −5.423 | n | 6 | −1.589 | −6.513 |
| | n | 7 | −3.940 | −5.423 | n | 8 | −6.685 | −0.501 |
| | n | 9 | −6.376 | 2.072 | n | 10 | −2.542 | 6.203 |
| | s | 2 | 3.940 | 5.423 | s | 1 | 1.589 | 6.513 |
| | s | 4 | 6.376 | −2.072 | s | 3 | 6.685 | 0.501 |
| | s | 6 | 0.000 | −6.704 | s | 5 | 2.542 | −6.203 |
| | s | 8 | −6.376 | −2.072 | s | 7 | −5.114 | −4.335 |
| | s | 10 | −3.940 | 5.423 | s | 9 | −5.703 | 3.524 |

TABLE 5

Polarity and Position for Track 2

| | Magnet A - all tracks start at 0° | | | | Magnet B - with angular offsets | | | |
| --- | --- | --- | --- | --- | --- | --- | --- | --- |
| Track | Polarity | Maxel # | X (mm) | Y (mm) | Polarity | Maxel # | X (mm) | Y (mm) |
| 2 | n | 1 | 0.000 | 10.954 | n | 2 | 5.388 | 9.537 |
| | n | 3 | 7.745 | 7.745 | n | 4 | 10.554 | 2.934 |
| | n | 5 | 10.954 | 0.000 | n | 6 | 9.537 | −5.388 |
| | n | 7 | 7.745 | −7.745 | n | 8 | 2.934 | −10.554 |
| | n | 9 | 0.000 | −10.954 | n | 10 | −5.388 | −9.537 |
| | n | 11 | −7.745 | −7.745 | n | 12 | −10.554 | −2.934 |
| | n | 13 | −10.954 | 0.000 | n | 14 | −9.537 | 5.388 |
| | n | 15 | −7.745 | 7.745 | n | 16 | −2.934 | 10.554 |
| | s | 2 | 4.192 | 10.120 | s | 1 | 1.328 | 10.873 |
| | s | 4 | 10.120 | 4.192 | s | 3 | 8.627 | 6.749 |
| | s | 6 | 10.120 | −4.192 | s | 5 | 10.873 | −1.328 |
| | s | 8 | 4.192 | −10.120 | s | 7 | 6.749 | −8.627 |
| | s | 10 | −4.192 | −10.120 | s | 9 | −1.328 | −10.873 |
| | s | 12 | −10.120 | −4.192 | s | 11 | −8.627 | −6.749 |
| | s | 14 | −10.120 | 4.192 | s | 13 | −10.873 | 1.328 |
| | s | 16 | −4.192 | 10.120 | s | 15 | −6.749 | 8.627 |

TABLE 6

Polarity and Position for Track 3

| | Magnet A - all tracks start at 0° | | | | Magnet B - with angular offsets | | | |
| --- | --- | --- | --- | --- | --- | --- | --- | --- |
| Track | Polarity | Maxel # | X (mm) | Y (mm) | Polarity | Maxel # | X (mm) | Y (mm) |
| 3 | n | 1 | 0.000 | 15.204 | n | 2 | 5.265 | 14.263 |
| | n | 3 | 8.220 | 12.790 | n | 4 | 12.140 | 9.153 |
| | n | 5 | 13.830 | 6.316 | n | 6 | 15.161 | 1.136 |
| | n | 7 | 15.049 | −2.164 | n | 8 | 13.369 | −7.241 |
| | n | 9 | 11.490 | −9.956 | n | 10 | 7.332 | −13.319 |
| | n | 11 | 4.283 | −14.588 | n | 12 | −1.033 | −15.169 |
| | n | 13 | −4.283 | −14.588 | n | 14 | −9.070 | −12.202 |
| | n | 15 | −11.490 | −9.956 | n | 16 | −14.227 | −5.362 |
| | n | 17 | −15.049 | −2.164 | n | 18 | −14.867 | 3.181 |
| | n | 19 | −13.830 | 6.316 | n | 20 | −10.787 | 10.714 |
| | n | 21 | −8.220 | 12.790 | n | 22 | −3.282 | 14.845 |
| | s | 2 | 4.283 | 14.588 | s | 1 | 1.033 | 15.169 |
| | s | 4 | 11.490 | 9.956 | s | 3 | 9.070 | 12.202 |
| | s | 6 | 15.049 | 2.164 | s | 5 | 14.227 | 5.362 |
| | s | 8 | 13.830 | −6.316 | s | 7 | 14.867 | −3.181 |
| | s | 10 | 8.220 | −12.790 | s | 9 | 10.787 | −10.714 |
| | s | 12 | 0.000 | −15.204 | s | 11 | 3.282 | −14.845 |
| | s | 14 | −8.220 | −12.790 | s | 13 | −5.265 | −14.263 |
| | s | 16 | −13.830 | −6.316 | s | 15 | −12.140 | −9.153 |
| | s | 18 | −15.049 | 2.164 | s | 17 | −15.161 | −1.136 |
| | s | 20 | −11.490 | 9.956 | s | 19 | −13.369 | 7.241 |
| | s | 22 | −4.283 | 14.588 | s | 21 | −7.332 | 13.319 |

TABLE 7

Polarity and Position for Track 4

| | Magnet A - all tracks start at 0° | | | | Magnet B - with angular offsets | | | |
|---|---|---|---|---|---|---|---|---|
| Track | Polarity | Maxel # | X (mm) | Y (mm) | Polarity | Maxel # | X (mm) | Y (mm) |
| 4 | n | 1  | 0.000   | 19.454  | n | 2  | 5.035   | 18.791  |
|   | n | 3  | 8.441   | 17.527  | n | 4  | 12.689  | 14.745  |
|   | n | 5  | 15.210  | 12.129  | n | 6  | 17.831  | 7.779   |
|   | n | 7  | 18.966  | 4.329   | n | 8  | 19.440  | −0.727  |
|   | n | 9  | 18.966  | −4.329  | n | 10 | 17.199  | −9.090  |
|   | n | 11 | 15.210  | −12.129 | n | 12 | 11.552  | −15.652 |
|   | n | 13 | 8.441   | −17.527 | n | 14 | 3.617   | −19.115 |
|   | n | 15 | 0.000   | −19.454 | n | 16 | −5.035  | −18.791 |
|   | n | 17 | −8.441  | −17.527 | n | 18 | −12.689 | −14.745 |
|   | n | 19 | −15.210 | −12.129 | n | 20 | −17.831 | −7.779  |
|   | n | 21 | −18.966 | −4.329  | n | 22 | −19.440 | 0.727   |
|   | n | 23 | −18.966 | 4.329   | n | 24 | −17.199 | 9.090   |
|   | n | 25 | −15.210 | 12.129  | n | 26 | −11.552 | 15.652  |
|   | n | 27 | −8.441  | 17.527  | n | 28 | −3.617  | 19.115  |
|   | s | 2  | 4.329   | 18.966  | s | 1  | 0.727   | 19.440  |
|   | s | 4  | 12.129  | 15.210  | s | 3  | 9.090   | 17.199  |
|   | s | 6  | 17.527  | 8.441   | s | 5  | 15.652  | 11.552  |
|   | s | 8  | 19.454  | 0.000   | s | 7  | 19.115  | 3.617   |
|   | s | 10 | 17.527  | −8.441  | s | 9  | 18.791  | −5.035  |
|   | s | 12 | 12.129  | −15.210 | s | 11 | 14.745  | −12.689 |
|   | s | 14 | 4.329   | −18.966 | s | 13 | 7.779   | −17.831 |
|   | s | 16 | −4.329  | −18.966 | s | 15 | −0.727  | −19.440 |
|   | s | 18 | −12.129 | −15.210 | s | 17 | −9.090  | −17.199 |
|   | s | 20 | −17.527 | −8.441  | s | 19 | −15.652 | −11.552 |
|   | s | 22 | −19.454 | 0.000   | s | 21 | −19.115 | −3.617  |
|   | s | 24 | −17.527 | 8.441   | s | 23 | −18.791 | 5.035   |
|   | s | 26 | −12.129 | 15.210  | s | 25 | −14.745 | 12.689  |
|   | s | 28 | −4.329  | 18.966  | s | 27 | −7.779  | 17.831  |

TABLE 8

Polarity and Position for Track 5

| | Magnet A - all tracks start at 0° | | | | Magnet B - with angular offsets | | | |
|---|---|---|---|---|---|---|---|---|
| Track | Polarity | Maxel # | X (mm) | Y (mm) | Polarity | Maxel # | X (mm) | Y (mm) |
| 5 | n | 1  | 0.000   | 23.704  | n | 2  | 4.765   | 23.220  |
|   | n | 3  | 8.563   | 22.103  | n | 4  | 12.831  | 19.931  |
|   | n | 5  | 15.969  | 17.517  | n | 6  | 19.164  | 13.950  |
|   | n | 7  | 21.219  | 10.566  | n | 8  | 22.909  | 6.085   |
|   | n | 9  | 23.603  | 2.187   | n | 10 | 23.560  | −2.602  |
|   | n | 11 | 22.799  | −6.487  | n | 12 | 21.029  | −10.937 |
|   | n | 13 | 18.916  | −14.285 | n | 14 | 15.658  | −17.796 |
|   | n | 15 | 12.478  | −20.153 | n | 16 | 8.172   | −22.250 |
|   | n | 17 | 4.356   | −23.300 | n | 18 | −0.417  | −23.700 |
|   | n | 19 | −4.356  | −23.300 | n | 20 | −8.950  | −21.949 |
|   | n | 21 | −12.478 | −20.153 | n | 22 | −16.275 | −17.234 |
|   | n | 23 | −18.916 | −14.285 | n | 24 | −21.401 | −10.191 |
|   | n | 25 | −22.799 | −6.487  | n | 26 | −23.637 | −1.771  |
|   | n | 27 | −23.603 | 2.187   | n | 28 | −22.681 | 6.887   |
|   | n | 29 | −21.219 | 10.566  | n | 30 | −18.662 | 14.615  |
|   | n | 31 | −15.969 | 17.517  | n | 32 | −12.122 | 20.370  |
|   | n | 33 | −8.563  | 22.103  | n | 34 | −3.945  | 23.373  |
|   | s | 2  | 4.356   | 23.300  | s | 1  | 0.417   | 23.700  |
|   | s | 4  | 12.478  | 20.153  | s | 3  | 8.950   | 21.949  |
|   | s | 6  | 18.916  | 14.285  | s | 5  | 16.275  | 17.234  |
|   | s | 8  | 22.799  | 6.487   | s | 7  | 21.401  | 10.191  |
|   | s | 10 | 23.603  | −2.187  | s | 9  | 23.637  | 1.771   |
|   | s | 12 | 21.219  | −10.566 | s | 11 | 22.681  | −6.887  |
|   | s | 14 | 15.969  | −17.517 | s | 13 | 18.662  | −14.615 |
|   | s | 16 | 8.563   | −22.103 | s | 15 | 12.122  | −20.370 |
|   | s | 18 | 0.000   | −23.704 | s | 17 | 3.945   | −23.373 |
|   | s | 20 | −8.563  | −22.103 | s | 19 | −4.765  | −23.220 |
|   | s | 22 | −15.969 | −17.517 | s | 21 | −12.831 | −19.931 |
|   | s | 24 | −21.219 | −10.566 | s | 23 | −19.164 | −13.950 |
|   | s | 26 | −23.603 | −2.187  | s | 25 | −22.909 | −6.085  |
|   | s | 28 | −22.799 | 6.487   | s | 27 | −23.560 | 2.602   |
|   | s | 30 | −18.916 | 14.285  | s | 29 | −21.029 | 10.937  |

TABLE 8-continued

Polarity and Position for Track 5

| | Magnet A - all tracks start at 0° | | | | Magnet B - with angular offsets | | | |
|---|---|---|---|---|---|---|---|---|
| Track | Polarity | Maxel # | X (mm) | Y (mm) | Polarity | Maxel # | X (mm) | Y (mm) |
| | s | 32 | −12.478 | 20.153 | s | 31 | −15.658 | 17.796 |
| | s | 34 | −4.356 | 23.300 | s | 33 | −8.172 | 22.250 |

TABLE 9

Polarity and Position for Track 6

| | Magnet A - all tracks start at 0° | | | | Magnet B - with angular offsets | | | |
|---|---|---|---|---|---|---|---|---|
| Track | Polarity | Maxel # | X (mm) | Y (mm) | Polarity | Maxel# | X (mm) | Y (mm) |
| 6 | n | 1 | 0.000 | 27.954 | n | 2 | 4.166 | 27.642 |
| | n | 3 | 8.240 | 26.712 | n | 4 | 12.129 | 25.185 |
| | n | 5 | 15.747 | 23.096 | n | 6 | 19.013 | 20.492 |
| | n | 7 | 21.855 | 17.429 | n | 8 | 24.209 | 13.977 |
| | n | 9 | 26.021 | 10.213 | n | 10 | 27.253 | 6.220 |
| | n | 11 | 27.876 | 2.089 | n | 12 | 27.876 | −2.089 |
| | n | 13 | 27.253 | −6.220 | n | 14 | 26.021 | −10.213 |
| | n | 15 | 24.209 | −13.977 | n | 16 | 21.855 | −17.429 |
| | n | 17 | 19.013 | −20.492 | n | 18 | 15.747 | −23.096 |
| | n | 19 | 12.129 | −25.185 | n | 20 | 8.240 | −26.712 |
| | n | 21 | 4.166 | −27.642 | n | 22 | 0.000 | −27.954 |
| | n | 23 | −4.166 | −27.642 | n | 24 | −8.240 | −26.712 |
| | n | 25 | −12.129 | −25.185 | n | 26 | −15.747 | −23.096 |
| | n | 27 | −19.013 | −20.492 | n | 28 | −21.855 | −17.429 |
| | n | 29 | −24.209 | −13.977 | n | 30 | −26.021 | −10.213 |
| | n | 31 | −27.253 | −6.220 | n | 32 | −27.876 | −2.089 |
| | n | 33 | −27.876 | 2.089 | n | 34 | −27.253 | 6.220 |
| | n | 35 | −26.021 | 10.213 | n | 36 | −24.209 | 13.977 |
| | n | 37 | −21.855 | 17.429 | n | 38 | −19.013 | 20.492 |
| | n | 39 | −15.747 | 23.096 | n | 40 | −12.129 | 25.185 |
| | n | 41 | −8.240 | 26.712 | n | 42 | −4.166 | 27.642 |
| | s | 2 | 4.166 | 27.642 | s | 1 | 0.000 | 27.954 |
| | s | 4 | 12.129 | 25.185 | s | 3 | 8.240 | 26.712 |
| | s | 6 | 19.013 | 20.492 | s | 5 | 15.747 | 23.096 |
| | s | 8 | 24.209 | 13.977 | s | 7 | 21.855 | 17.429 |
| | s | 10 | 27.253 | 6.220 | s | 9 | 26.021 | 10.213 |
| | s | 12 | 27.876 | −2.089 | s | 11 | 27.876 | 2.089 |
| | s | 14 | 26.021 | −10.213 | s | 13 | 27.253 | −6.220 |
| | s | 16 | 21.855 | −17.429 | s | 15 | 24.209 | −13.977 |
| | s | 18 | 15.747 | −23.096 | s | 17 | 19.013 | −20.492 |
| | s | 20 | 8.240 | −26.712 | s | 19 | 12.129 | −25.185 |
| | s | 22 | 0.000 | −27.954 | s | 21 | 4.166 | −27.642 |
| | s | 24 | −8.240 | −26.712 | s | 23 | −4.166 | −27.642 |
| | s | 26 | −15.747 | −23.096 | s | 25 | −12.129 | −25.185 |
| | s | 28 | −21.855 | −17.429 | s | 27 | −19.013 | −20.492 |
| | s | 30 | −26.021 | −10.213 | s | 29 | −24.209 | −13.977 |
| | s | 32 | −27.876 | −2.089 | s | 31 | −27.253 | −6.220 |
| | s | 34 | −27.253 | 6.220 | s | 33 | −27.876 | 2.089 |
| | s | 36 | −24.209 | 13.977 | s | 35 | −26.021 | 10.213 |
| | s | 38 | −19.013 | 20.492 | s | 37 | −21.855 | 17.429 |
| | s | 40 | −12.129 | 25.185 | s | 39 | −15.747 | 23.096 |
| | s | 42 | −4.166 | 27.642 | s | 41 | −8.240 | 26.712 |

Figure 25:
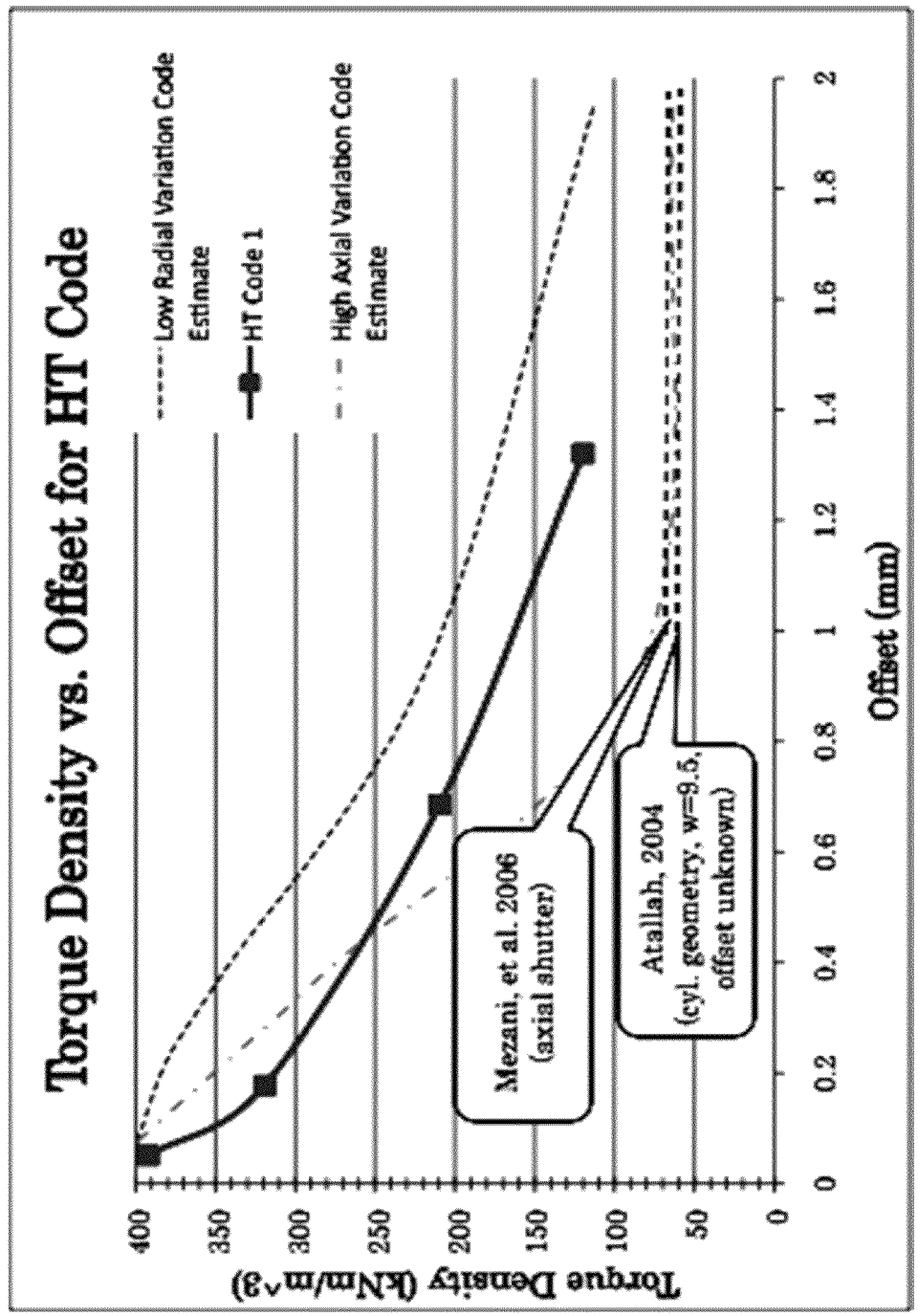
FIG. 25 depicts exemplary torque density versus offset between the disks of FIG. 24.

The torque density versus offset of a magnet pair printed with this code is shown in FIG. 25. The torque density was calculated using the volume of the magnets plus the volume of the aluminum fixtures required to hold them. This was done to generate torque density numbers that are more easily compared to numbers in the literature. The torque densities reported for two shutter gear architectures are also included in the figure. It is difficult to compare these devices directly for several reasons. First, the scale of the axial field shutter described by Mezani, et al [23] is somewhat larger: it has a 4" OD and each side is nearly 1" thick. There are 0.5 mm gaps between the magnets and the iron shutter structures. It is hard to estimate what the effective air gaps are for this device, so the torque densities are shown spanning a range of offsets from 1 to 2 mm. The other device referenced in this diagram is described by Atallah et al [26] and is a co-axial cylinder architecture that is more challenging to compare to this couple, but also has a lower torque density than the axial-field shutter. But, the torque density for the axial field shutter is calculated using only the active magnetic material. By using only the active magnetic material to calculate the Torque Densities for the HT Code Maxel Array Couple, the numbers double. This means that this device is demonstrating a torque density that is 3.5 to 5 times that reported for the axial field shutter and not the far more conservative 1.5 to 2.5 times illustrated in FIG. 25. Again, it is difficult to compare these two devices, but in terms of torque density, the HT Code seems to set a new standard.

Figure 26:
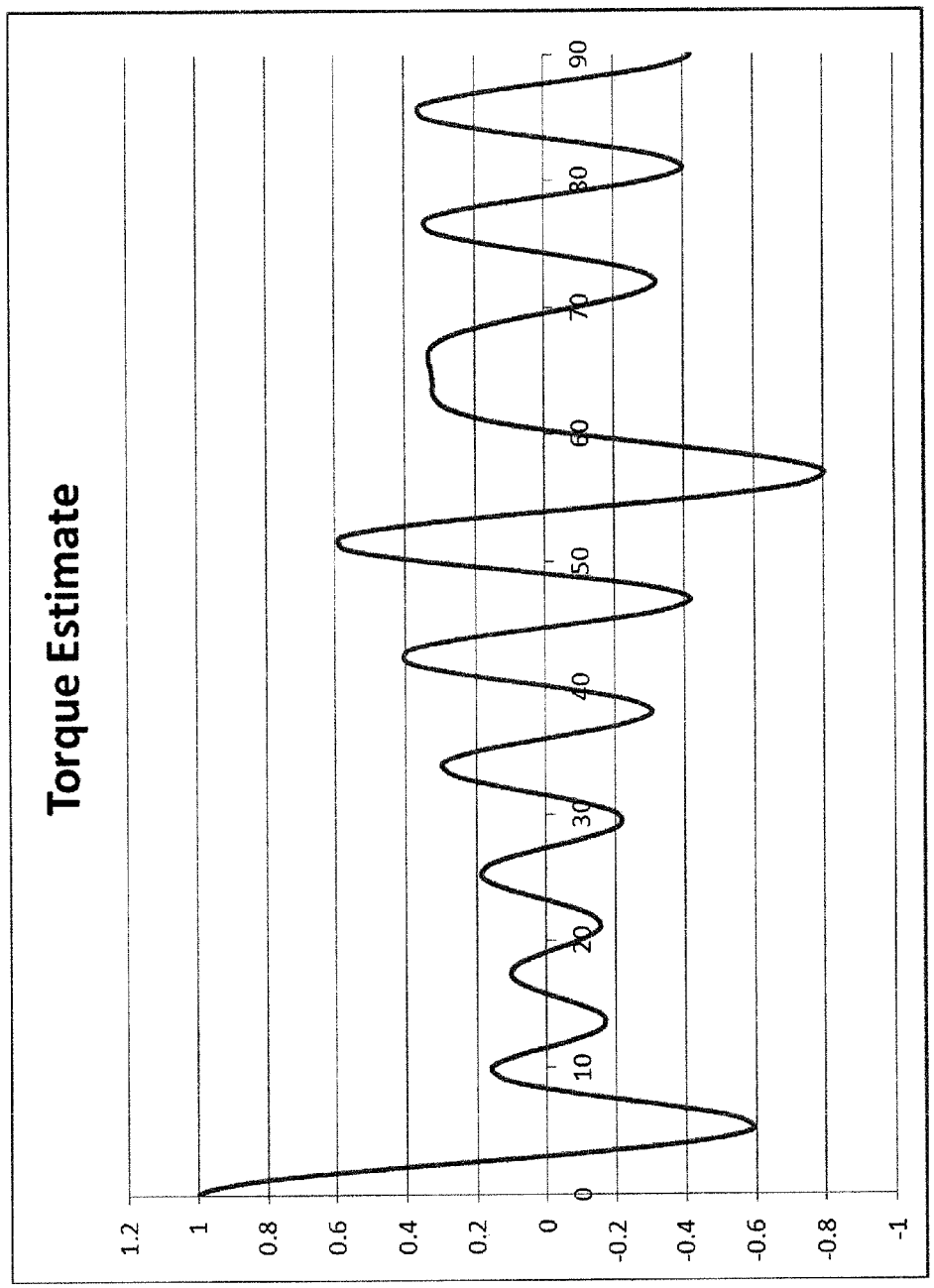
FIG. 26 depicts an exemplary torque estimate over 90 degrees rotation of the first magnetic structure of FIG. 24 relative to the second magnetic structure of FIG. 24.

FIG. 26 depicts an exemplary torque estimate over 90 degrees rotation of the first magnetic structure of FIG. 24 relative to the second magnetic structure of FIG. 24.

Figure 27:
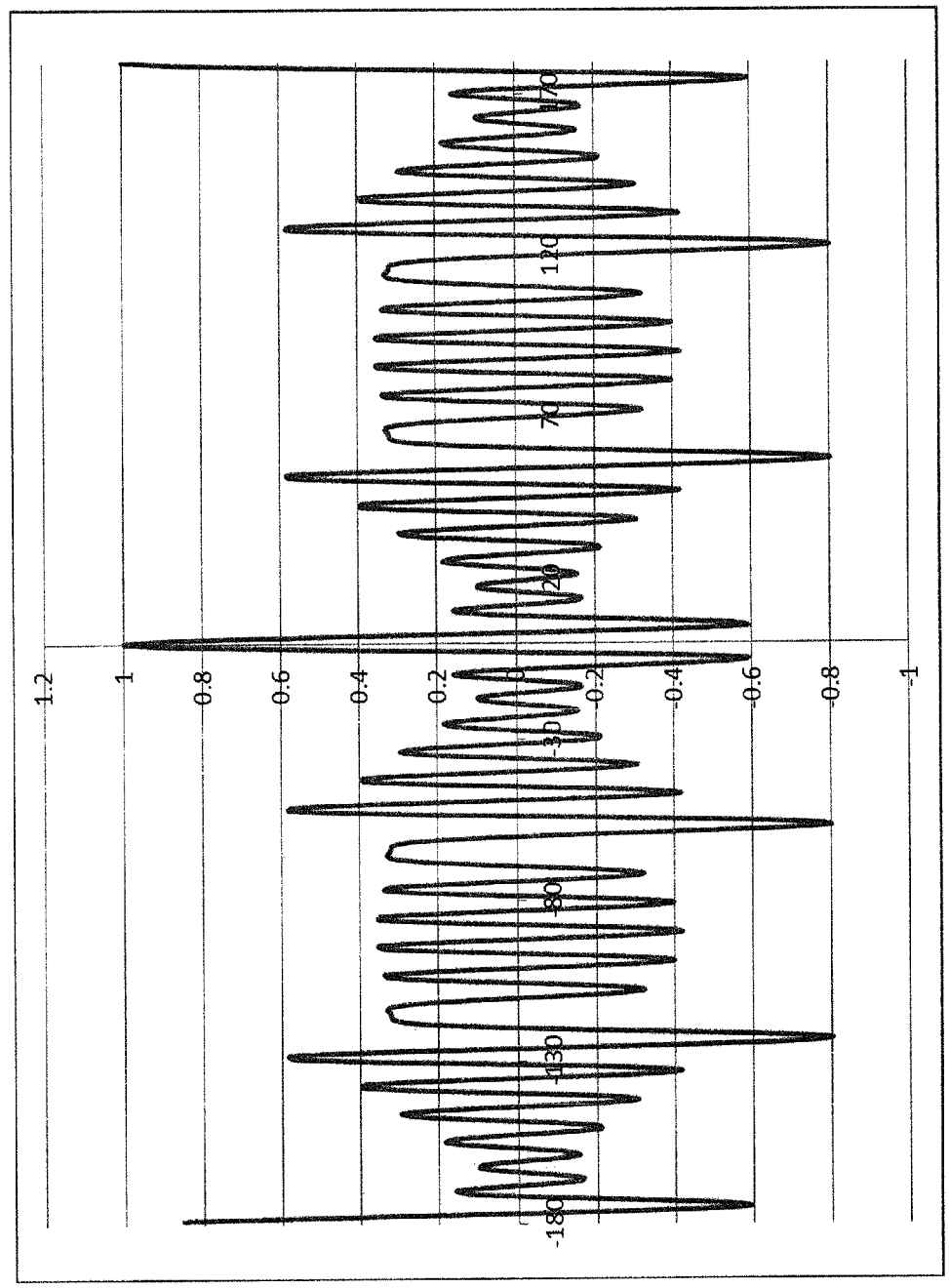
FIG. 27 depicts an exemplary torque estimate over a complete 360 degree rotation of the first magnetic structure of FIG. 24 relative to the second magnetic structure of FIG. 24.

FIG. 27 depicts an exemplary torque estimate over a complete 360 degree rotation of the first magnetic structure of FIG. 24 relative to the second magnetic structure of FIG. 24.

While particular embodiments of the invention have been described, it will be understood, however, that the invention is not limited thereto, since modifications may be made by those skilled in the art, particularly in light of the foregoing teachings.

REFERENCES

1. Krasil'nikov, A. Ya. Krasil'nikov, A. A., 2008, "Calculation of the Shear Force of Highly Coercive Permanent Magnets in Magnetic Systems With Consideration of Affiliation to a Certain Group Based on Residual Induction", Chemical and Petroleum Engineering, Vol. 44, Nos. 7-8, p.362-65
2. Furlani, E. P., 2001, "Permanent Magnet and Electromechanical Devices", Academic Press, San Diego.
3. Lorimer, W., Hartman, A., 1997, "Magnetization Pattern for Increased Coupling in Magnetic Clutches", IEEE Transactions on Magnetics, Vol. 33, No. 5, September 1997
4. Armstrong, C. G., 1901, "Power Transmitting Device", U.S. Pat. No. 0,687,292
5. Neuland, A. H., 1916, "Apparatus for Transmitting Power", U.S. Pat. No. 1,171,351
6. Faus, H. T., 1940, "Magnet Gearing", U.S. Pat. No. 2,243,555
7. Reese, G. A., 1967, "Magnetic Gearing Arrangement", U.S. Pat. No. 3,301,091
8. Schlaeppi, H. P., 1968, "Magnetic Gears", U.S. Pat. No. 3,382,386
9. Liang, N., 1972, "Magnetic Transmission", U.S. Pat. No. 3,645,650
10. Mabe, Jr., W. J., 1991, "Magnetic Transmission", U.S. Pat. No. 5,013,949
11. Ackermann, B., Honds, L., 1997, "Magnetic drive arrangement comprising a plurality of magnetically cooperating parts which are movable relative to one another", U.S. Pat. No. 5,633,555
12. Yao, Y., Lee, C., Wang, S., Huang, D., 2000, "Method of designing optimal bi-axial magnetic gears and system of the same", U.S. Pat. No. 6,047,456
13. Furlani, E. P., 2000, "Analytical analysis of magnetically coupled multipole cylinders", J. Phys. D: Appl. Phys., Vol. 33, No. 1, p. 28-33.
14. Jorgensen, F. T., Andersen, T. O., Rasmussen P. O., 2005, "Two dimensional model of a permanent magnet spur gear", Conf. Record of the 2005 IEEE Industry Applications Conference, p. 261-5
15. Krasil'nikov, A. Ya. Krasil'nikov, A. A., 2009, "Torque Determination for a Cylindrical Magnetic Clutch", Russian Engineering Research, Vol. 29, No. 6, pp. 544-47
16. Kyung-Ho Ha, Young-Jin Oh, Jung-Pyo Hong, 2002, "Design and Characteristic Analysis of Non-Contact Magnet Gear for Conveyor by Using Permanent Magnet", Conf. Record of the 2002 IEEE Industry Applications Conference, p. 1922-27
17. General Electric DP 2.7 Wind Turbine Gearbox, http://www.gedrivetrain.com/insideDP27.cfm, referenced June 2010
18. Neugart PLE-160, One-Stage Planetary Gearbox, http://www.neugartusa.com/ple_160_gb.pdf, referenced June 2010
19. Boston Gear 221S-4, One-stage Helical Gearbox, http://www.bostongear.com/pdf/product_sections/200_series_helical.pdf, referenced June 2010
20. Atallah, K., Howe, D. 2001, "A Novel High-Performance Magnetic Gear", IEEE Transactions On Magnetics, Vol. 37, No. 4, July 2001, p. 2844-46
21. Charpentier, J. F., Lemarquand, G., 2001, "Mechanical Behavior of Axially Magnetized Permanent-Magnet Gears", IEEE Transactions on Magnetics, Vol. 37, No. 3, May 2001, p. 1110-17
22. Xinhua Liu, K. T. Chau, J. Z. Jiang, Chuang Yu, 2009, "Design and Analysis of Interior-magnet Outer-rotor Concentric Magnetic Gears", Journal of Applied Physics, Vol. 105
23. Mezani, S., Atallah, K., Howe, D., 2006, "A high-performance axial-field magnetic gear", Journal of Applied Physics Vol. 99
24. Cheng-Chi Huang, Mi-Ching Tsai, Dorrell, D. G., Bor-Jeng Lin, 2008, "Development of a Magnetic Planetary Gearbox", IEEE Transactions on Magnetics, Vol. 44, No. 3, p. 403-12
25. Jorgensen, F. T., Andersen, T. O., Rasmussen, P. O. "The Cycloid Permanent Magnetic Gear", IEEE Transactions on Industry Applications, Vol. 44, No. 6, November/December 2008, p. 1659-65
26. Atallah, K., Calverley, S. D., D. Howe, 2004, "Design, analysis and realisation of a high-performance magnetic gear", IEE Proc.-Electr. Power Appl., Vol. 151, No. 2, March 2004
27. Jian, L., Chau, K. T., 2010, "A Coaxial Magnetic Gear With Halbach Permanent-Magnet Arrays", IEEE Transactions on Energy Conversion, Vol. 25, No. 2, June 2010, p. 319-28
28. Linni Jian, K. T. Chau, Yu Gong, J. Z. Jiang, Chuang Yu, Wenlong Li, 2009, "Comparison of Coaxial Magnetic Gears With Different Topologies", IEEE Transactions on Magnetics, Vol. 45, No. 10, October 2009, p. 4526-29
29. Correlated Magnetics Research, 2009, Online Video, "Innovative Magnetics Research in Huntsville", http://www.youtube.com/watch?v=m4m81JjZCJo
30. Correlated Magnetics Research, 2009, Online Video, "Non-Contact Attachment Utilizing Permanent Magnets", http://www.youtube.com/watch?v=3xUm25CNNgQ
31. Correlated Magnetics Research, 2010, Company Website, http://www.correlatedmagnetics.com
32. Jae Seok Choi, Jeonghoon Yoo, Shinji Nishiwaki, and Kazuhiro Izui, 2010, "Optimization of Magnetization Directions in a 3-D Magnetic Structure", IEEE Transactions on Magnetics, Vol. 46, No. 6, June 2010, p. 1603-06
33. K. T. Chau, Dong Zhang, J. Z. Jiang, Linni Jian, 2008, "Transient Analysis of Coaxial Magnetic Gears Using Finite Element Comodeling", Journal of Applied Physics, Vol. 103
34. Furlani, E. P., 1996, "Analysis and optimization of synchronous magnetic couplings", J. Appl. Phys., Vol. 79, No. 8, p. 4692
35. Bassani, R., 2007, "Dynamic Stability of Passive Magnetic Bearings", Nonlinear Dynamics, V. 50, p. 161-68
36. Tsurumoto, K., 1992, "Basic Analysis on Transmitted Force of Magnetic Gear Using Permanent Magnet", IEEE Translation Journal on Magnetics in Japan, Vol 7, No. 6, June 1992, p. 447-52

The invention claimed is:

1. A magnetic shear force transfer device for transferring shear forces across a non-magnetic gap, said magnetic shear force transfer device comprising:
a first magnetic structure comprising a first plurality of magnetic sources magnetically printed into a first magnetizable material in accordance with a first pattern; and
a second magnetic structure comprising a second plurality of magnetic sources magnetically printed into a second magnetizable material in accordance with a second pattern, said first and second patterns defining the print location and polarity of each magnetic source of said first and second pluralities of magnetic sources, wherein the first pattern corresponds to a first plurality of concentric circular tracks and said second pattern corresponds to a second plurality of concentric circular tracks, wherein each concentric circular track of said first plurality of concentric circular tracks has an even number of magnetic sources, wherein each concentric circular track of said second plurality of concentric circular tracks has an even number of magnetic sources, wherein adjoining magnetic sources alternate in polarity in each circular track of said first plurality of concentric circular tracks, wherein adjoining magnetic sources alternate in polarity in each circular track of said second plurality of concentric circular tracks, wherein one or more tracks of said first plurality of concentric circular tracks are rotated relative to one or more tracks of said second plurality of concentric circular tracks such that a maximum torque condition coincides to one angular orientation between said first and second magnetic structures.

2. The magnetic shear force transfer device of claim 1, wherein distances between print positions of adjoining magnetic sources and the amounts of magnetizing current used to generate H fields that create adjoining opposite polarity B fields in said first and second magnetizable material are selected to produce a desired force profile.

3. The magnetic shear force transfer device of claim 1, wherein shear forces are transferred as torque.

4. The magnetic shear force transfer device of claim 1, wherein the non-magnetic gap is an air gap.

5. The magnetic shear force transfer device of claim 1, wherein said desired force profile corresponds to a force versus distance curve.

6. The magnetic shear force transfer device of claim 1, wherein said desired force profile corresponds to a torque versus a rotation of said first magnetic structure relative to said second magnetic structure.

7. The magnetic shear force transfer device of claim 1, further comprising:
a first shunt plate positioned on a back side of said first magnetic structure.

8. The magnetic shear force transfer device of claim 1, further comprising:
a second shunt plate positioned on a back side of said second magnetic structure.

9. The magnetic shear force transfer device of claim 1, further comprising:
an intermediate layer located between said first magnetic structure and said second magnetic structure.

10. The magnetic shear force transfer device of claim 9, wherein said intermediate layer is a non-magnetic material.

11. A method for manufacturing a magnetic shear force transfer device for transferring shear forces across a non-magnetic gap, said method comprising:
producing a first magnetic structure by magnetically printing a first plurality of magnetic sources into a first magnetizable material in accordance with a first pattern; and
producing a second magnetic structure by magnetically printing a second plurality of magnetic sources into a second magnetizable material in accordance with a second pattern, said first and second patterns defining the print location and polarity of each magnetic source of said first and second pluralities of magnetic sources, wherein the first pattern corresponds to a first plurality of concentric circular tracks and said second pattern corresponds to a second plurality of concentric circular tracks, wherein each concentric circular track of said first plurality of concentric circular tracks has an even number of magnetic sources, wherein each concentric circular track of said second plurality of concentric circular tracks has an even number of magnetic sources, wherein adjoining magnetic sources alternate in polarity in each circular track of said first plurality of concentric circular tracks, wherein adjoining magnetic sources alternate in polarity in each circular track of said second plurality of concentric circular tracks, wherein one or more tracks of said first plurality of concentric circular tracks are rotated relative to one or more tracks of said second plurality of concentric circular tracks such that a maximum torque condition coincides to one angular orientation between said first and second magnetic structures.

12. The method of claim 11, further comprising:
determining a desired distance between print positions of adjoining magnetic sources and desired amounts of magnetizing current used to generate H fields that create adjoining opposite polarity B fields in a magnetizable material that produce a desired force profile, wherein distances between print positions of adjoining magnetic sources substantially correspond to the desired distance and the amounts of magnetizing current used to generate H fields that create adjoining opposite polarity B fields in said first and second magnetizable material substantially correspond to the desired amounts of magnetizing current.

13. The method of claim 11, wherein shear forces are transferred as torque.

14. The method of claim 11, wherein the non-magnetic gap is an air gap.

15. The method of claim 11, wherein said desired force profile corresponds to a force versus distance curve.

16. The method of claim 11, wherein said desired force profile corresponds to a torque versus a rotation of said first magnetic structure relative to said second magnetic structure.

17. The method of claim 11, further comprising:
providing a first shunt plate on a back side of said first magnetic structure.

18. The method of claim 11, further comprising:
providing a second shunt plate on a back side of said second magnetic structure.

19. The method of claim 11, further comprising:
providing an intermediate layer between said first magnetic structure and said second magnetic structure.

20. The method of claim 19, wherein said intermediate layer is a non-magnetic material.

* * * * *